US009170647B2

(12) United States Patent
Cho

(10) Patent No.: US 9,170,647 B2
(45) Date of Patent: Oct. 27, 2015

(54) MOBILE TERMINAL AND METHOD OF CONTROLLING THE MOBILE TERMINAL

(71) Applicant: LG ELECTRONICS INC., Seoul (KR)

(72) Inventor: Kyoungmin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/258,785

(22) Filed: Apr. 22, 2014

(65) Prior Publication Data
US 2014/0340334 A1 Nov. 20, 2014

(30) Foreign Application Priority Data

May 15, 2013 (KR) ........................ 10-2013-0055267

(51) Int. Cl.
G06F 3/01 (2006.01)
H04N 21/41 (2011.01)
H04N 21/4367 (2011.01)
H04N 21/442 (2011.01)
G06F 3/041 (2006.01)
H04N 21/4223 (2011.01)
H04N 21/431 (2011.01)

(52) U.S. Cl.
CPC ............... *G06F 3/013* (2013.01); *G06F 3/041* (2013.01); *G06F 3/0416* (2013.01); *H04N 21/4122* (2013.01); *H04N 21/4126* (2013.01); *H04N 21/4223* (2013.01); *H04N 21/4312* (2013.01); *H04N 21/4367* (2013.01); *H04N 21/44218* (2013.01)

(58) Field of Classification Search
CPC ......... G06F 3/01; G06F 3/013; G06F 3/0416; G06F 3/0486; G06F 3/0488; H04M 1/72533; H04M 21/42204; H04M 21/44218; H04M 21/44222
See application file for complete search history.

(56) References Cited

U.S. PATENT DOCUMENTS

| 2011/0267374 | A1* | 11/2011 | Sakata et al. | 345/672 |
| 2012/0064948 | A1* | 3/2012 | Lee et al. | 455/566 |
| 2012/0066619 | A1 | 3/2012 | Lee | 715/760 |
| 2012/0256967 | A1* | 10/2012 | Baldwin et al. | 345/684 |
| 2012/0300061 | A1* | 11/2012 | Osman et al. | 348/135 |
| 2013/0097525 | A1 | 4/2013 | Kim et al. | 715/748 |
| 2013/0169560 | A1* | 7/2013 | Cederlund et al. | 345/173 |
| 2013/0201276 | A1* | 8/2013 | Pradeep et al. | 348/14.03 |
| 2015/0015479 | A1* | 1/2015 | Cho | 345/156 |
| 2015/0031352 | A1* | 1/2015 | Yi et al. | 455/420 |

FOREIGN PATENT DOCUMENTS

WO WO 2012/139240 A1 10/2012

OTHER PUBLICATIONS

European Search Report issued in Application No. 14001489.5 dated Sep. 29, 2014.
Sachin Srnivas et al.: "A survey report on mobile eye-based Human-Computer Interaction", Information Society (I-Society), 2011; International Conference on, IEEE, Jun. 27, 2011, pp. 146-151, XP032009883, ISBN: 978-1-61284-148-9.

* cited by examiner

Primary Examiner — Joe H Cheng
(74) Attorney, Agent, or Firm — KED & Associates LLP

(57) ABSTRACT

Disclosed is the mobile terminal including a display to display a first screen information, a user tracking device to detect that a user's stare with respect to a connected external electronic apparatus is within a predetermined range with the display serving as a reference, and a controller to receive a second screen information from the connected external electronic apparatus based on the detected user's stare, and the controller to control the display to simultaneously display the received second screen information and the first screen information.

32 Claims, 20 Drawing Sheets

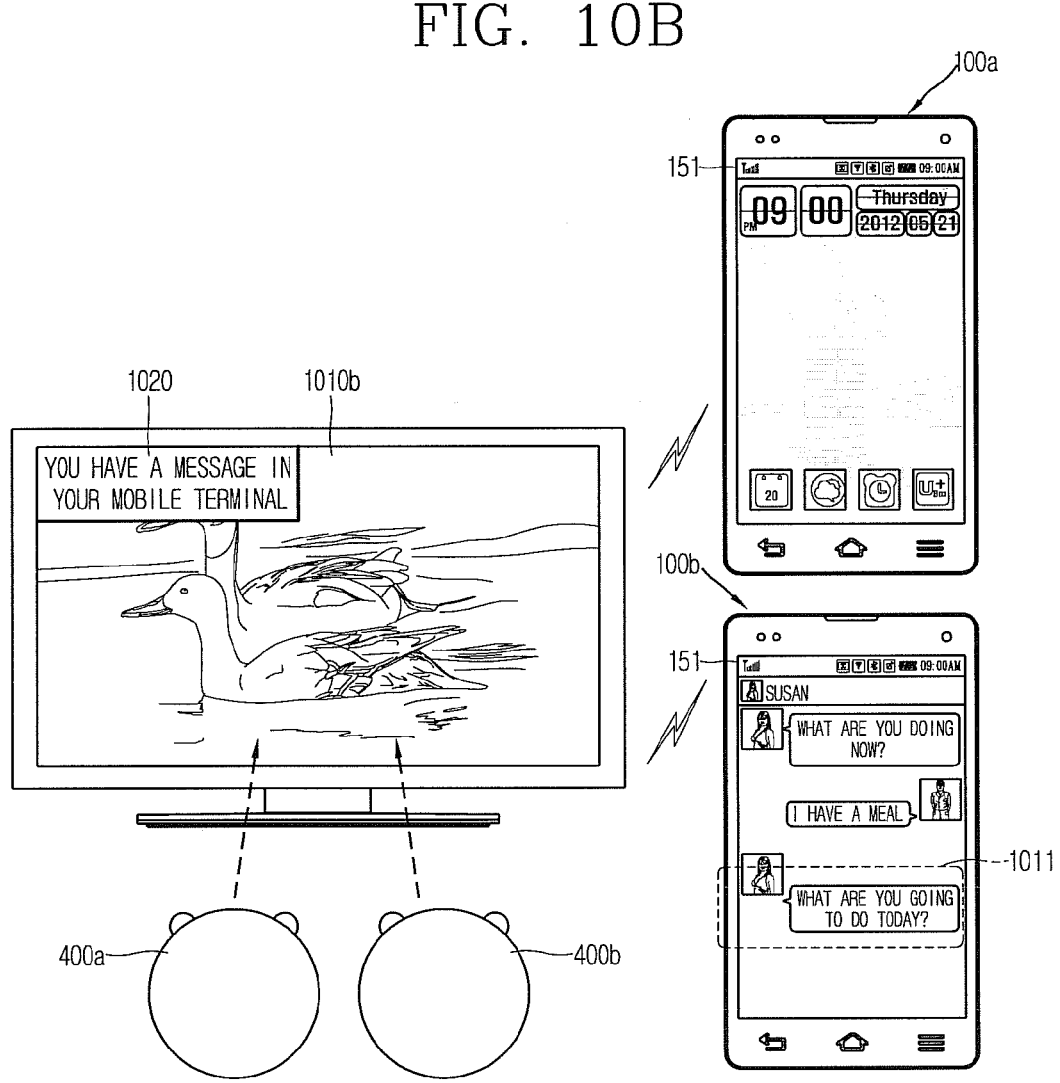

(a)

(b)

MOBILE TERMINAL AND METHOD OF CONTROLLING THE MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2013-0055267, filed on May, 15, 2013, the contents of which is incorporated by reference herein in its entirety.

BACKGROUND

1. Field

The present invention relates to a mobile terminal and a method of controlling the mobile terminal, and particularly to a mobile terminal that is capable of connecting to an external electronic apparatus and a method of controlling the mobile terminal.

2. Background

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by means of hardware or software.

On the other hand, occasionally, the user may view or use content displayed on a different electronic apparatus at the same time or alternatively while viewing content displayed on the mobile terminal. In such a case, the user experiences an inconvenience in that he/she has to view a screen of the mobile terminal and a screen of the different electronic apparatus alternatively in order to use all the content displayed on the mobile terminal and the different electronic apparatus.

SUMMARY OF THE DISCLOSURE

Therefore, an aspect of the detailed description is to provide a mobile terminal that is capable of receiving a content screen displayed on an external electronic apparatus connected to it and displaying the content screen on it as well and a method of controlling the mobile terminal.

Another aspect of the detailed description is to provide a mobile terminal that is capable of displaying a content screen being displayed on an external electronic apparatus to it and remotely controlling the content screen from it and a method of controlling the mobile terminal.

To achieve advantages and in accordance with the purpose of this specification, as embodied and broadly described herein, there is provided a mobile terminal including a display unit on which a first screen information is displayed, a detection unit that is connected to an external electronic apparatus and detects that a user's stare with respect to the connected external electronic apparatus is moved to within a predetermined range with the display unit serving as a reference, and a controller that receives a second screen information that is output to the connected external electronic apparatus, based on the user's stare detected and performs control in such a manner that the received second screen information is displayed on one region of the display unit along with the first screen information.

In the mobile terminal, the detection unit may detect a movement of the user's stare by using a first signal corresponding to whether or not to detect a user's eye, which is received from the external electronic apparatus connected through a wireless communication unit and a second signal corresponding to whether or not to detect the user's, which is detected by using at least one sensor provided on the mobile terminal.

In the mobile terminal, the display unit may be divided into a first region and a second region distinguishable from the first region, and when the user's stare detected is moved to within the predetermined range with the display unit serving as the reference, the controller may control the display unit in such a manner that the first screen information is displayed on the first region and the second screen information is displayed on the second screen.

In the mobile terminal, the controller may designate the second region, based on a touch input, and may control the display unit in such a manner that the second screen information is displayed on the designated second region.

The mobile terminal may further include an inclination detection unit that detects an inclination of the mobile terminal, in which the controller may determine the second region on which the second screen information is displayed, based on the user's stare detected, and the detected inclination of the mobile terminal.

In the mobile terminal, when the user's stare detected stays on the first position on the display unit, the controller may control the display unit in such a manner that the second screen information is displayed on the first position.

In the mobile terminal, in a state where the second screen information is displayed on the display unit, when the user's stare detected stays on a region to which the first screen information is output, for a predetermined time, the controller may perform control in such a manner that the second screen information disappears from the display unit.

In the mobile terminal, in a state where the second screen information is displayed on the display unit, when the user's stare detected stays on a region on which the second screen information is displayed, the controller may perform control in such a manner the second screen information is displayed on all regions of the display unit.

In the mobile terminal, when a first touch is applied to a region on which the second screen information is displayed, the controller may reduce the second screen information and may display the reduced second screen information, and when a second touch is applied to the second screen information, the controller may control the display unit in such a manner that the second screen information is displayed on all regions of the display unit.

In the mobile terminal, when a third touch is applied to the region on which the second screen information is displayed, the controller may control the display unit in such a manner that the second screen information is reduced or enlarged corresponding to the direction in which the third touch is applied and the extent to which the third touch is dragged, and thus the reduced or enlarged second screen information is displayed.

In the mobile terminal, when an event occurs in a state where the second screen information is displayed on the display unit, the controller may switch the first screen information and the second screen information to screen information relating to the event that occurs, or may output an icon for switching to the screen information to the display unit.

In the mobile terminal, when it is detected that the user's stare within the predetermined range with the display unit serving as the reference is moved to a screen of the connected external electronic apparatus, the control unit may transmit the first information to the connected external electronic apparatus.

In the mobile terminal, if the first screen information is transmitted to the connected external electronic apparatus and an event occurs in the mobile terminal, the controller may transmit event data corresponding to the event to the connected external electronic apparatus when in a normal mode, and may transmit only a notification message telling an occurrence of the event to the connected external electronic apparatus when in a user protection mode.

In the mobile terminal, when the connected external electronic apparatus is additionally connected to the different electronic apparatus and the stares of the multiple users stay on the screen of the connected external electronic apparatus, the controller may perform control in such a manner that the user protection mode is automatically entered.

In the mobile terminal, when in a state where the second screen information is displayed on the display unit, a predetermined condition is met, the controller may execute at least one remote control function associated with the second screen information.

In the mobile terminal, the predetermined condition may be based on any one of a touch input with respect to a popping-up menu key, a voice signal input, a user gesture, information on the user's stare and a touch input with respect to the second screen information.

In the mobile terminal, when in a state where the second screen information is displayed on the display unit, an input mode is entered, the controller may perform control, in such a manner that at least one part of a region on which the second screen information is displayed is switched to a region into which information is input and the information input into the region is displayed on the second screen information in a manner the information overlaps with the second screen information.

The mobile terminal may further include a user detection unit that is configured to detect a user location from an image captured by a camera provided, in which the controller may control at least one of an output state of screen information that are displayed on the display unit and a volume of sound that is output to an audio output module, based on a distance between a detected user location and the display unit.

In the mobile terminal, when a predetermined time is exceeded after it is detected that the user's stare with respect to the connected external electronic apparatus is moved to within the predetermined range with the display unit serving as the reference, the controller may transmit a wireless signal for converting at least one of a screen and a sound of the connected external electronic apparatus into a deactivated state, to the connected external electronic apparatus.

In the mobile terminal, the controller may transmit a wireless signal for gradually adjusting at least one of brightness of the screen and a volume of the sound of the connected external electronic apparatus according to the extent to which the predetermined time is exceeded, to the connected external electronic apparatus.

In the mobile terminal, when the predetermined time is exceeded after it is detected that the user's stare within the predetermined range with the display unit serving as the reference is moved to the connected external electronic apparatus, the controller may transmit a wireless signal for converting at least one of the screen and the sound of the connected external electronic apparatus into an activated state to the connected external electronic apparatus.

To achieve advantages and in accordance with the purpose of this specification, as embodied and broadly described herein, there is provided a method of controlling a mobile terminal, including displaying first screen information is displayed, establishing a connection to an external electronic apparatus and detecting that a user's stare with respect to the connected external electronic apparatus is moved to within a predetermined range with the display unit serving as a reference, receiving a second screen information that is output to the connected external electronic apparatus, based on the user's stare detected, and displaying the received second screen information on at least one region of the display unit along with the first screen information.

The method may further displaying the second screen information on all regions of the display unit when the user's stare detected stays on a region on which the second screen information is displayed, in a state where the second screen information is displayed on the display unit, and causing the second screen information to disappear from the display unit when the user's stare detected stays on a region to which the first screen information is output, for a predetermined time, in a state where the second screen information is displayed on the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein:

FIGS. 10A and 10B are diagrams for an operating method that is used to process the event that occurs, in the external electronic apparatus when the event occurs in the mobile terminal while viewing screen information displayed on the external electronic apparatus connected to the mobile terminal according to the present invention;

DETAILED DESCRIPTION

Figure 1:
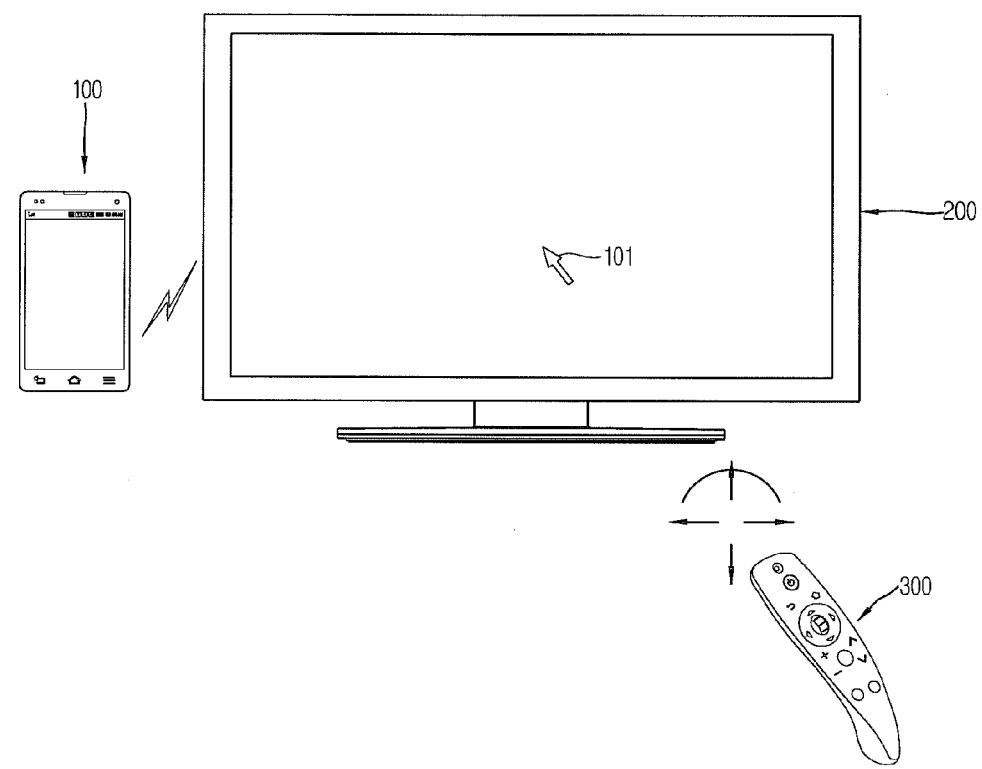
FIG. 1 is a diagram illustrating the mobile terminal according to an embodiment of the present invention and an external electronic apparatus that connects to the mobile terminal.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

The suffixes attached to components of the wireless speaker, such as 'module' and 'unit or 'portion' were used for facilitation of the detailed description of the present invention. Therefore, the suffixes do not have different meanings from each other.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted.

If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents A mobile terminal according to the present invention may include a smart phone, a laptop computer, a digital broadcasting terminal, a Personal Digital Assistant (PDA), a Portable Multimedia Player (PMP), a navigator, etc. However, it will be obvious to those skilled in the art that the present invention may be also applicable to a fixed terminal such as a digital TV and a desktop computer, except for specific configurations for mobility.

FIG. 1 is a diagram illustrating the mobile terminal according to an embodiment of the present invention and an external electronic apparatus that connects to the mobile terminal.

Referring to FIG. 1, the mobile terminal 100 is connected to the external electronic apparatus, for example, a graphic display apparatus 200 by cable or wirelessly. The mobile terminal 100 is connected to the graphic display apparatus 200, and thus transmits content displayed on the mobile terminal 100 to the graphic display apparatus 200. In addition, the graphic display apparatus 200 is connected to the mobile terminal 100, and thus transmits content, output to the graphic display apparatus 200, and the information relating to the content to the mobile terminal 100.

On the other hand, although not illustrated in FIG. 1, the mobile terminal 100 and the graphic display apparatus 200 connect to a predetermined server (not illustrated). In this case, the mobile terminal 100 requests the server for transmission of already-stored data, and requests the server to transmit the data to the graphic display apparatus 200.

The mobile terminal 100 and the graphic display apparatus 200 are connected to each other by using wireless connection standards, such as a digital living network alliance (DLNA) guidelines, Wi-Fi standards, Wi-Fi Direct standards and BLUETOOTH standards. This connection or connectivity between the mobile terminal 100 and the graphic display apparatus 200 is a pairing.

When the mobile terminal 100 and the graphic display apparatus 200 are connected to each other wirelessly in this manner, the mobile terminal 100 is remotely controlled from the graphic display apparatus 200, or the graphic display apparatus 200 is remotely controlled from the mobile terminal 100, with a virtual network computing (VNC) technology that uses the remote frame buffer (RFB) protocols.

On the other hand, FIG. 1 illustrates a television set, as an example of the graphic display apparatus 200, and a spatial remote controller, as an example of an external input device 300 for remotely controlling the graphic display apparatus

200. The external input device 300 transmits a signal to and from the graphic display apparatus 200 according to RF communication standards. A pointer 101, which corresponds to movement of the external input device 300, is displayed on a screen of the external input device 300 in response to upward and downward, left and right, back and forth movements of or rotation of the external input device 300 by the user. The external input device 300 is called the spatial remote controller because the pointer 101, while moving, is displayed on the screen of the graphic display apparatus 200 depending on the spatial movement of the external input device 300.

Figure 2:
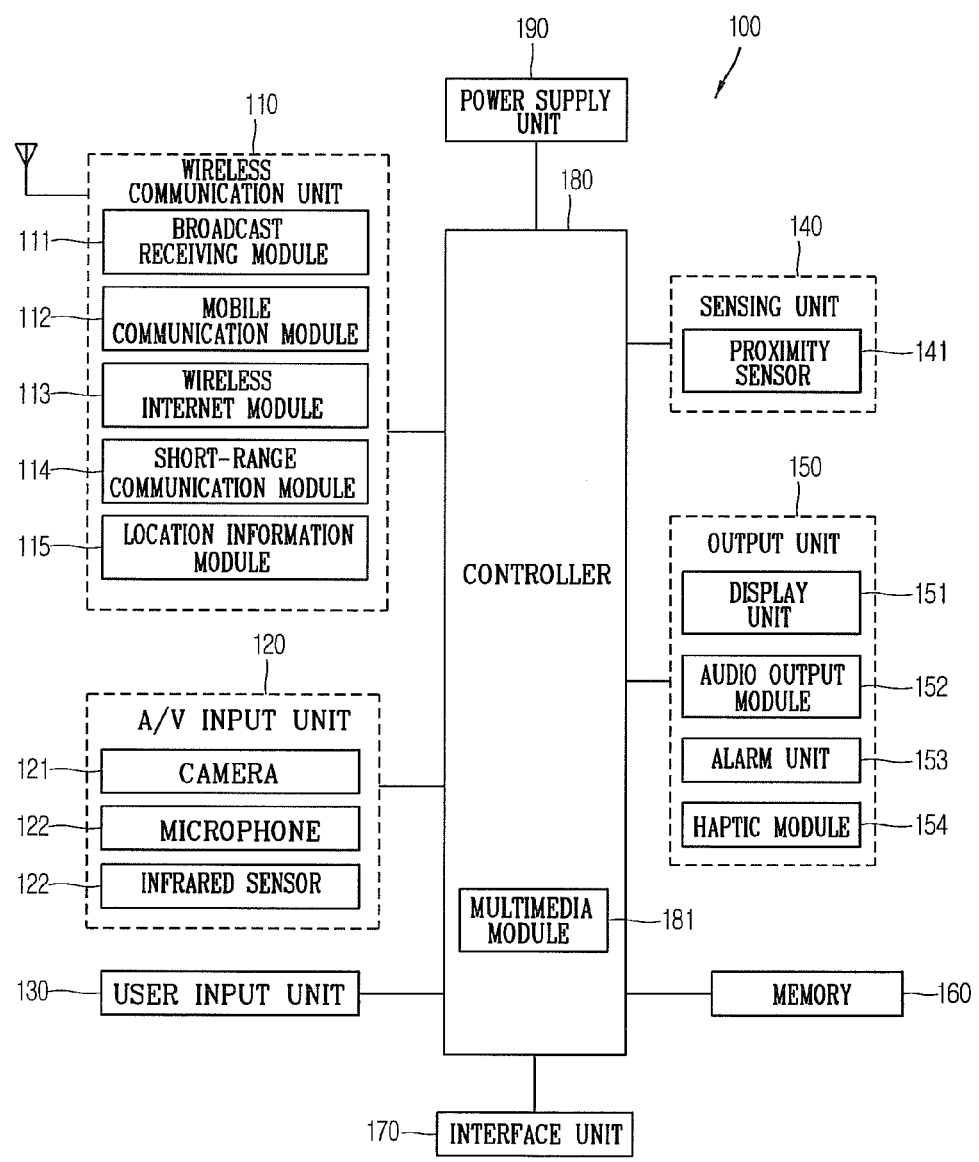
FIG. 2 is a block diagram illustrating a configuration of the mobile terminal according to the embodiment of the present invention.

FIG. 2 is a block diagram of a mobile terminal 100 according to an embodiment of the present invention.

As shown in FIG. 2, the mobile terminal 100 includes a radio communication unit 110, an A/V (Audio/Video) input unit 120 ('user tracing unit'), a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components 110-190 will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network. In this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™ and the like.

The location information module 115 is a module for acquiring a location (or position) of the mobile communication terminal. For example, the location information module 115 may include a GPS (Global Positioning System) module.

Referring to FIG. 2 the A/V input unit 120 is configured to receive an audio or video signal, and to trace a user based on the received signal. The A/V input unit 120 may include a camera 121, a microphone 122, an infrared sensor 123, etc. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. Audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may comprise a proximity sensor 141. The sensing unit 140 may also comprise a touch sensor (not shown) for sensing a touch operation on the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure.

If the display unit 151 and a touch sensitive sensor (referred to as a touch sensor) have a layered structure therebetween, the structure may be referred to as a touch screen. The display unit 151 may be used as an input device rather than an output device. Such display unit 151 may be referred to as a 'touch screen'.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153 and a haptic module 154.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the audio output module 152. Therefore, the display unit 151 and the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal 100 is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 3A:
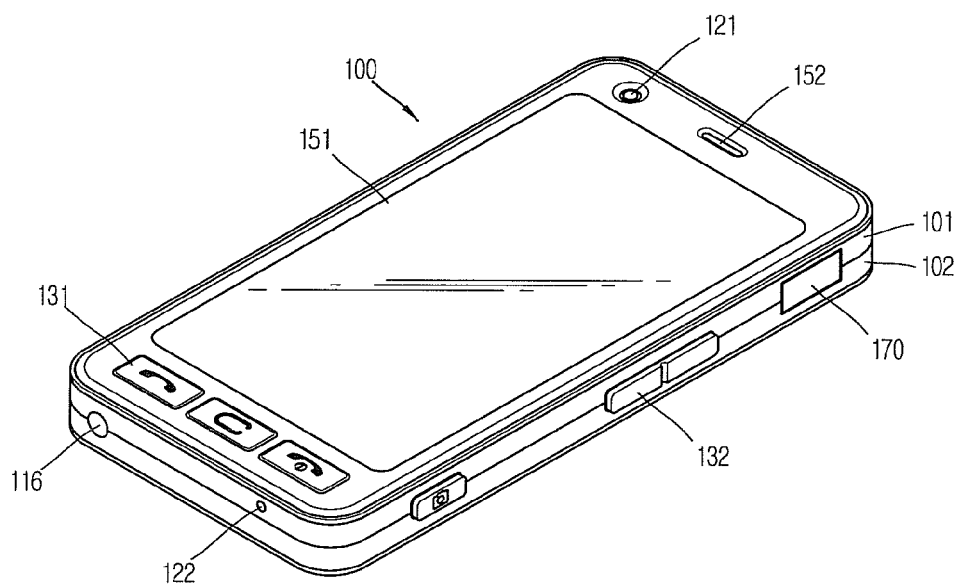
FIGS. 3A and 3B are perspective views, each illustrating an external appearance of the mobile terminal according to the embodiment of the present invention.
Figure 3B:
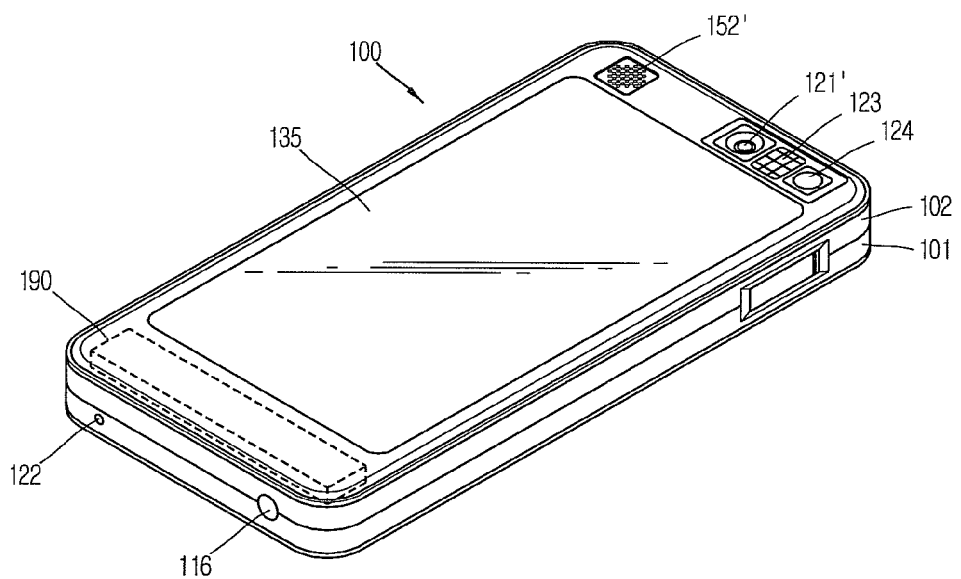

FIGS. 3A and 3B are perspective views showing the appearance of the mobile terminal 100 according to the present invention.

FIG. 3A is a view showing a front surface and one side surface of the mobile terminal 100 in accordance with the present invention, and FIG. 3B is a view showing a rear surface and another side surface of the mobile terminal 100.

As shown in FIG. 3A, the mobile terminal 100 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 2), a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 3B, a camera 121' may be additionally provided on the rear case 102. The camera 121' faces a direction which is opposite to a direction faced by the camera 121 (refer to FIG. 3A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate or pop-up.

A flash 123 and a mirror 124 may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the terminal body. The audio output unit 152' may cooperate with the audio output unit 152 (refer to FIG. 3A) disposed on a front surface of the terminal body so as to implement a stereo function. Also, the audio output unit 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 3A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

Figure 4:
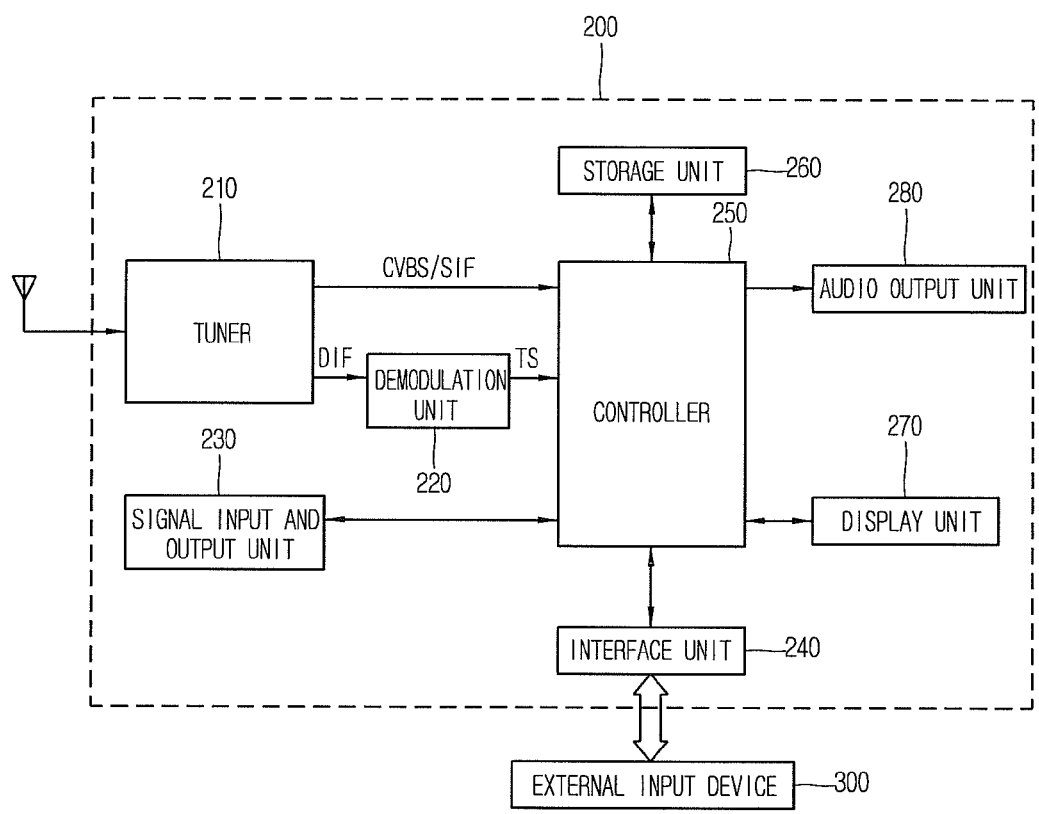
FIG. 4 is a block diagram illustrating a configuration of the external electronic apparatus that is connected to the mobile terminal according to the embodiment of the present invention.

FIG. 4 is a block diagram illustrating the graphic display apparatus 200 and the external input device 300, which are associated with the present invention.

The graphic display apparatus 200 throughout the present specification includes an apparatus that receives and displays radio broadcasts or records and reproduces moving images, and an apparatus that records and reproduces audio.

The graphic display apparatus 200 includes a tuner 210, a demodulation unit 220, a signal input and an output unit 230, an interface unit 240, a controller 250, a storage unit 260, a display unit 270 and an audio output unit 280. The external input device 300 is an apparatus that is separated from the graphic display apparatus 200, but may be included as one constituent element of the graphic display apparatus 200.

Referring to FIG. 4, the tuner 210 selects a broadcast signal corresponding to a channel selected by the user, from radio frequency (RF) broadcast signals, and converts the selected broadcast signal into an intermediate frequency signal or a baseband video and voice signal. For example, if the RF broadcast signal is a digital broadcast signal, the tuner 210 converts the RF broadcast signal into a digital IF signal (DIF). In contrast, if the RF broadcast signal is an analog broadcast signal, the tuner 210 converts the RF broadcast signal into a baseband video and voice signal (CVBS/SIF). In this manner, the tuner 210 is a hybrid tuner that processes the digital broadcast signal and the analog broadcast signal.

A digital IF signal (DIF), output from the tuner 210, is input into the demodulation unit 220, and the analog baseband video and voice signal (CVBS/SIF), output from the tuner 210, is input into the controller 250.

The tuner 210 receives a single carrier RF broadcast signal according to advanced television systems committee (ATSC) standards or a multiple-carrier RF broadcast signal according to digital video broadcasting (DVB) standards. Although one tuner 210 is illustrated in the drawings, the graphic display apparatus 200 is not limited to the one tuner and may include the multiple tuners, for example, first and second tuners. In this case, the first tuner receives a first RF broadcast signal corresponding to the broadcast channel selected by the user, and the second tuner receives a second RF broadcast signal corresponding to the already-stored broadcast channel sequentially and periodically. The second tuner converts the RF broadcast signal into the digital IF signal (DIF), or the analog baseband video and voice signal (CVBS/SIF), in the same manner as the first tuner.

The demodulation unit 220 receives the digital IF signal (DIF) that results from the conversion and performs a demodulation operation.

The digital IF signal (DIF), output from the tuner 210, is in the ATSC format, the demodulation unit 220 performs 8-vestigial side band (8-VSB) modulation. The 8-vestigial side band (8-VSB) demodulation results from vestigial side band modulation, which is single carrier amplitude modulation using a national television system committee (NTSC) frequency bandwidth. At this time, the demodulation unit 220 performs channel decoding, such as Trellis decoding, de-interleaving, and Reed-Solomon decoding. To do this, the demodulation unit 220 includes a Trellis decoder, a deinterleaver, a Reed-Solomon decoder, and the like.

When the digital IF signal (DIF), output from the tuner 210, is in the DVB format, the demodulation unit 220 performs coded orthogonal frequency division modulation (COFDMA) modulation. At this time, the demodulation unit 220 performs channel decoding, such as convolution decoding, the de-interleaving, and the Reed-Solomon decoding. To do this, the demodulation unit 220 includes a convolution decoder, the deinterleaver, and the Reed-Solomon decoder.

In this manner, the demodulation unit 220 outputs a stream signal TS after performing the demodulation and the channel decoding. At this time, the stream signal results from multiplexing a video signal, a voice signal, or a data signal. For example, the stream signal TS is an MPEG-2 transport stream (TS) that results from multiplexing a MPEG-2 standard video signal, a Dolby AC-3 standard voice signal, and the like. Here, MPEG-2 TS includes a 4 byte header and a 184 byte payload.

In this manner, the signal, output from the demodulation unit 220 is input into the controller 250 and goes through inverse multiplexing and video and voice signal processing.

The signal input and output unit 230 is by a cable or wirelessly connected to an external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 230 includes an A/V input and output unit for connection to a cable network and a wireless communication unit for connection to a wireless network.

The A/V input/output unit includes an Ethernet port, a USB port, a composite video banking sync (CVBS) port, a composite port, an S-video port (analog), a digital visual interface (DVI) port, a high definition multimedia interface (HDMI) port, a mobile high-definition link (MHL) port, an RGB port, a D-SUB port, an IEEE 1394 port, an SPDIF port, a liquid HD port, and the like. A digital signal, input through such ports, is transferred to the controller 250. At this time, an analog signal, input through the CVBS port and the S-VIDEO port, is converted into the digital signal by an analog-to-digital converter (not illustrated) and is transferred to the controller 250.

The wireless communication unit performs wireless connection to the Internet. The wireless communication unit performs the wireless connection to the Internet by using wireless communication technologies, such as wireless LAN (WLAN) (Wi-Fi), wireless broadband (Wibro), world interoperability for microwave access (Wimax), and high speed downlink packet access (HSPPA). In addition, the wireless communication unit can perform short-range communication with a different electronic apparatus. For example, the wireless communication unit performs the short-range communication by using short-range communication technologies, such as Bluetooth, radio frequency identification (RFID), infrared light communication (IrDA, infrared Data Association), ultra wideband (UWB), and ZigBee.

The signal input and output unit 230 connects to a predetermined web page over the wireless and cable networks and thus transmits the data to and from the server and additionally receives content or various items of data, for example, the content, such as movies, an advertisement, a game, VOD, and broadcast signals and various items of information relating to the content, which are provided a content service provider or a network administer.

The signal input and output unit 230 receives firmware update information and update files provided by the network administrator over the cable and wireless networks, and receives an application selected by the user among application that are placed in a public domain.

The signal input and output unit 230 transfers an image signal, a voice signal, and the data signal that are provided by the external apparatus, to the controller 250. In addition, the signal input and output unit 230 transfers the image signal, the voice signal, and the data signal included in various media files stored in an external storage device, such as a memory device and a hard disk drive, to the controller 250. In addition, the signal input and output unit 230 transfers the image signal, the voice signal, and the data signal that are processed by the controller 250, to the external apparatus described above, or the different external apparatus.

More specifically, the signal input and output unit 230 is connected to the set-top box, for example, a set-top box for Internet Protocol TV (IPTV), through at least one of the ports described above, and performs the signal input and output operation.

In addition, the signal input and output unit 230 transfers the image signal, the voice signal, and the data signal, which are processed by the set-up box for IPTV in such a manner the image signal, the voice signal, and the data signal are available for bidirectional communication, to the controller 250, and transfers the signals processed by the controller 250 back to the set-up box for IPTV. The IPTV here includes ADSL-TV, VDSL-TV, and FTTH-TV that are different in transmission network. The IPTV includes TV over DSL, video over DSL, TV over IP (TVIP), Broadband TV (BTV) and the like. In addition, the IPTV includes Internet TV and full browsing TV in which Internet connection is possible.

The digital signal, output from the signal input and output unit 230, also includes the stream signal TS. The stream signal TS, described above, is a signal that results from multiplexing the image signal, the voice signal, and the data signal.

The interface unit 240 transfers the signal, input by the user, to the controller 250, or transfers the signal transferred from the controller 250, to the user.

The interface unit 240 transfers a user input signal, input into a power key, a channel key, a volume key, a setting key and the like, to the controller 250. In addition, the interface unit 240 includes a sensing unit (not illustrated) for sensing a user gesture, a user location, a touch, and the like. To do this, the sensing unit includes a touch sensor, a voice sensor, a location sensor, a motion sensor, a gyro sensor, and the like. In such a case, the interface unit 240 transfers an input signal, input from the sensing unit, to the controller 250, or transmits the signal coming from the controller 250 to the sensing unit.

The interface unit 240 receives an input signal that the user inputs with the remote controller, for example, the spatial remote controller, to perform power source control, channel, selection, screen setting and the like, or transmits the signal processed by the controller 250 to the external input device 300. At this time, the interface unit 240 and the external input device 300 are connected to each other, by a cable or wirelessly.

In addition, the interface unit 240 receives personal information from the external input device 300 and/or receives information on a web server in connection by using the personal information. For example, if the mobile terminal approaches the external input device within a predetermined distance and performs near field communication (NFC), the external input device 300 receives the personal information and others stored in the mobile terminal. The personal information here is information that is necessary to log on with a predetermined account before making a connection to the electronic apparatus or using the service.

The controller 250 controls general operation of the graphic display apparatus 200. Specifically, the controller 250 generates or outputs a signal for the image or voice output by inversely multiplexing the stream signal TS that is received through the tuner 210, the demodulation unit 220, and/or the signal input and output unit 230, or by processing the inversely-multiplexed signals. For example, the controller 250 controls the tuner 210 in such a manner that the RF broadcast signal corresponding to the channel selected by the user or the already-stored channel is tuned.

The image signal image-processed by the controller 250 is transferred to the display unit 270 and an image corresponding to a resolution image signal is output. The voice signal processed by the controller 250 is transferred to the audio output unit 280 and a sound is output. In addition, the image signal and/or the voice signal, which is processed by the controller 250, is input into an output device of the external apparatus through the signal input and an output unit 230.

Although not illustrated in the drawings, the controller 250 includes, for example, an inverse multiplexing unit, an image processing unit, an on-screen-display (OSD) generation unit and a voice processing unit, a data processing unit, a channel browsing processing unit and others in order to generate or output the signal for the image or sound output by inversely multiplexing the stream signal TS or by processing the inversely-multiplexed signals.

The inverse multiplexing unit (not illustrated) inversely multiplexes the stream signal TS that is input. For example, if the MPEG-2 stream signal TS is input, the inverse multiplexing unit inversely multiplexes the MPEG-2 stream signal TS into the image signal, the voice signal, and the data signal. The stream signal TS here, as described above, is an output from the tuner 210, the demodulation unit 220, and/or the signal input and output unit 230.

The imaging processing unit (not illustrated) performs image processing, for example, decoding, on the inversely-multiplexed image signal. More specifically, the image processing unit decodes an MPEG-1 standard-encoded image signal by using an MPEG-2 decoder, and decodes an H.264 standard-encoded image signal according to digital multimedia broadcasting (DMB) standard or digital video broadcast-handheld (DVB-H) standards by using an H.264 decoder. In addition, the image processing unit performs the imaging processing in such a manner that brightness, tint and color of the image signal are adjusted. In addition, the image processing unit performs scaling in such a manner that the inversely-multiplexed image signal is output on the display unit 270. In this manner, the image signal, which is image-processed by the image processing unit, is transferred to the display unit 270 or transferred to an external output apparatus (not illustrated) through an external output port.

The OSD generation unit (not illustrated) generates an OSD signal depending on a user input or in itself. More specifically, the OSD generation unit generates a signal for displaying various items of information in the form of a graphic or a text on the screen of the display unit 270, for example, based on at least one of the image signal and the data signal or an input signal that is received from the external input device 300. The generated OSD signal includes a user interface, various menu screens, a widget, and an icon, which are provided by the graphic display apparatus 200 and a pointer corresponding to a pointing signal that is transmitted from the external input device 300. In addition, the generated OSD signal includes a 2D object or a 3D object.

The controller 250 mixes the OSD signal that is generated by the OSD generation unit and the image signal that is image-processed and decoded by the image processing unit. The mixed image signal goes through a frame rate convert (FRC) to change its image frame rate. In addition, the mixed image signal goes through a formatter and is output with its image signal format being changed, or is separated into a 2D image signal and a 3D image signal for 3D image display, or is converted from the 2D image signal into the 3D image signal.

The voice processing unit (not illustrated) performs, voice processing, for example, decoding, on the inversely multiplexed voice signal. More specifically, the voice processing unit decodes the MPEG-2 standard-encoded voice signal by using the MPEG-2 decoder, decodes a MPEG 4 bit sliced arithmetic coding (BSAC) standard-encoded voice signal according to the DMB standards by using an MPEG 4 decoder, and decodes a MPEG 2 advanced audio coded (AAC) standard-encoded voice signal according to satellite DMB standards or the digital video broadcast-handheld (DVB-H) standards by using an AAC decoder. In addition, the voice processing unit performs base processing, treble processing, and sound volume processing. The voice signal that is processed by the voice processing unit in this manner is transferred to the audio output unit 280, for example, a speaker, or is transferred to an external out device.

The data processing unit (not illustrated) performs data processing, for example, decoding, on the inversely multiplexed voice signal. The data signal here includes electronic program guide (EPG) information including broadcast information, such as a broadcasting-starting time and a broadcasting-ending time of a broadcast program that is broadcast over each channel. The EPG information includes, for example, ATSC-program and system information protocol (ATSC-PSIP) information in the case of ATSC standards and includes DVB-service information (DVB-SI) information in the case of DVB. The ATSC-PSIP information or the DVB-SI information here is included in a header (4 byte) of the MPEG-2 stream signal TS.

The channel browsing processing unit (not illustrated) receives the stream signal TS, output from the demodulation unit 220, or the stream signal, output from the signal input and output unit 230, as an input, and extracts an image from it, thereby generating a thumbnail image. The generated thumbnail image, as it is, or as is encoded, is input into the controller 250. In such a case, the controller 250 displays a thumbnail list including the multiple thumbnail images on the display unit 270 by using the thumbnail image that is input. At this time, the thumbnail images in the thumbnail list are displayed on all the regions of the display unit 270, or are displayed one region of the display unit 270 in a manner that enables the thumbnail images to be easily viewable. In addition, the thumbnail images in the thumbnail list are sequentially updated.

On the other hand, the controller 250 performs signal processing on the analog baseband image/voice (CVBS/SIF). For example, the analog baseband image and voice signal (CVBS/SIF), input into the controller 250, is the analog baseband image and voice signal, output from the tuner 210 or the signal input and output unit 230. The controller 250 performs the control in such a manner that the analog baseband image and voice signal (CVBS/SIF) that is input is processed, the signal-processed image signal is displayed on the display unit 270, and the signal-processed voice signal is output to the audio output unit 280.

In addition, the controller 250 controls operation of the graphic display apparatus 200 with a user command, input through the signal input and output unit 230 or the interface unit 240, or with an internal program. More specifically, the controller 250 determines whether or not the external apparatus is connected, depending on the input of the personal information from the external input device 300, based on information on the adjacent external apparatus around the graphic display apparatus 200, which is received from the signal input and an output unit 230 or the interface unit 240, and based on remote-control information on the different external apparatus, such as a channel, a frequency, and a code. Then, the controller 250 displays an object indicating the external apparatus being connected, on the display unit 270.

In addition, the controller 250 displays at least one object that is to be displayed on the display unit 270, as a 3D object. For example, in addition to a Web screen (a newspaper, a magazine, and the like) and an electronic program (EPG) guide, which are connected, the object here includes at least one of a menu of various items, a widget, an icon, a still image, moving images, and a text.

In addition, the controller 250 detects a user gesture by analyzing individually or combinedly an image that is captured by an imaging device (not illustrated), a signal that is detected by a sensing unit (not illustrated), and an input signal that is transmitted by the external input device 300.

In addition, the controller 250 identifies a location of the user, the images captured by the imaging unit (not illustrated). For example, the controller 250 measures a distance (an X-axis coordinate) between the user and the graphic display apparatus 200, and additionally measures an X-axis coordinate and a Y-axis coordinate inside the display unit 270, which correspond to the location of the user.

The storage unit 260 is used to store a program for the signal processing and the control by the controller 250, and stores information on a predetermined broadcast channel through the use of the signal-processed image signal, the voice signal and the data signal, and a channel memory function such as generating a channel map writing. The storage unit 260 includes at least one of the following storage media: a flash memory, a hard disk, a multimedia card micro type), a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In addition, the storage unit 260 stores IR format key codes for controlling different external apparatuses and stores IR format key database for multiple external apparatuses.

The image signal, the data signal, and the OSD signal that are processed by the controller 250, or the image signal, the data signal, and a control signal and others that are received from the signal input and output unit 230 or the interface unit 240 are converted into an RGB signal, and a drive signal is generated. Through this process, the resulting image is output to the display unit 270. The display unit 270 is realized in various forms as follows: a plasma display panel (PDP), a liquid crystal display (LCD), a thin film transistor-liquid crystal display (TFT-LCD), an organic light emitting diode (OLED), a flexible display, a 3D display, and an e-ink display.

For example, if the display unit 270 is a 3D display, this is realized with an add-on display type or a sole display type that enables 3D image viewing. The sole display type is for the display unit 270 to solely realize a 3D image without a separate display, for example, without using a pair of glasses. For example, the sole display type is categorized into a lenticular type and a parallax barrier type. In addition, the add-on display type is for the display unit 270 to realize the 3D image by using a 3D viewing device. For example, the add-on display type is categorized into a head-mounted display (HMD) type and a glasses type.

In addition, if the display unit 270 is realized with a touch screen-equipped touch screen, the display unit 270 functions as the input device as well as the output device.

The touch sensor is configured in such a manner as to convert a pressure applied to a specific portion of the display unit 270, a change in electrostatic capacitance occurring in a specific portion of the display unit 270, or the like into an electrical signal. The touch sensor is configured in such a manner as to detect the pressure that is applied to the touch sensor at the time of the touch, as well as a position and an area of the touch sensor that a touching object touches on. The touching object here is an object that applies the touch to the touch sensor, and includes, for example, a finger, a touch pen or a stylus, a pointer and the like.

If the touch input is applied to the touch sensor, a signal(s) corresponding to the touch input is sent to a touch controller. After processing the signal(s), the touch controller transmits the corresponding data to the controller 250. Because of this, the controller 250 identifies which region of the display unit 270 is touched on.

The audio output unit 280 receives the voice signal processed by the controller 250, for example, a stereo signal or a 5.1 channel signal, as an input, and outputs a sound corresponding to the processed voice signal. To do this, the audio output unit 280 is realized as various types of speakers.

The graphic display apparatus 200 includes the imaging unit (not illustrated) for photographing the user. The imaging unit is realized as one camera, but is not limited to one camera. The imaging unit can be realized to include the multiple cameras. Information on the image captured by the imaging unit is input into the controller 250, and the controller 250 accordingly detects the user gesture, based the captured image.

In addition, the graphic display apparatus 200 includes an image communication unit (not illustrated) that is configured to include a microphone (not illustrated) in addition to the imaging unit (not illustrated). The controller 250 signal-processes the information on the image captured by the imaging unit and information collected by the microphone and transmits the result of the signal processing to an image communication apparatus of the other party through the signal input and an output unit 230 or the interface unit 240.

A power supply unit (not illustrated) supplies electric power to the graphic display apparatus 200 across the board. Specifically, the power supply unit supplies electric power the controller 250 that is realized in the form of a system-on chip (SOC), the display unit 270 for displaying the image, and the audio output unit 280 for outputting audio.

To do this, the power supply unit (not illustrated) includes a converter (not illustrated) that converts DC power into AC power. On the other hand, for example, if the display unit 270 is realized as a liquid crystal panel including multiple backlight lamps, the power supply unit further includes an inverter (not illustrated) in which PWM operation is possible for brightness variability and dimming drive.

The external input device 300 is connected to the interface unit 240 by a cable or wirelessly and transmits the input signal that is generated according to the user input, to the interface unit 240. The external input device 300 includes a remote controller (for example, the spatial remote controller), a mouse, a keyboard, a wheel, and the like. The remote controller transmits the input signal to the interface unit 240 by using Bluetooth communication, RF communication, IR communication, ultra wideband (UWB) communication, ZigBee communication, or the like. If the external input device 300 is realized, specifically, as the spatial remote controller, the external input device 300 generates the input signal by detecting a movement of the main body.

On the other hand, the graphic display apparatus 200 is realized as a fixed-type digital broadcast receiver or a mobile digital broadcast receiver.

If the graphic display apparatus 200 is realized as the fixed type digital broadcast receiver, the graphic display apparatus 200 is realized in such a manner as to receive at least one of the following broadcast types: digital broadcast to which to apply an ATSC type (8-VSB type) that uses a single carrier, digital broadcast to which to apply a ground wave DVB-T type (COFDM type) that uses multiple carriers, and digital broadcast in which to apply an ISDB-T type (BST-OFDM type) digital broadcast that allows for the use of different broadcast channel depending on a user authority.

If the graphic display apparatus 200 is realized as the mobile digital broadcast receiver, the graphic display apparatus 200 is realized in such a manner as to receive at least one of the following broadcast types: digital broadcast to which to apply a ground wave DMB type, digital broadcast to which to apply a satellite DMB type, digital broadcast to which to apply an ATSC-M/H type, digital broadcast to which to apply a digital video broadcast-handheld (DVB-H) type, and digital broadcast to which to apply a media forward link-only type.

On the other hand, the graphic display apparatus 200 is realized as the digital broadcast receiver for cable communication, satellite communication or IPTV. In addition, the image display apparatus 200 described above is applied to the mobile terminal as well.

The mobile terminal 100 described above according to the present invention is connected to the external electronic apparatus 200, a user tracking unit 120 of the mobile terminal 100 detects that a user's stare with respect to the external electronic apparatus 200 is moved to within a predetermined range with the display unit 151 of the mobile terminal 100 serving as a reference.

When it is detected that the user's stare is moved by the user tracking unit 120, the controller 180 of the mobile terminal 100 receives screen information that is output to the connected external electronic apparatus 200 and displays the received screen information on one region of the display unit 151, along with the screen information that is earlier displayed on the mobile terminal 100.

Because of this, if while viewing content displayed on the mobile terminal 100, the user wants to view or use content displayed on the connected electronic apparatus 200 at the same time, he/she is provided with a user environment where the multiple items of content can be viewed and used at the same time in the one apparatus without causing the inconvenience of alternately viewing screens of the corresponding apparatuses.

A method of controlling the mobile terminal according to the embodiment of the present invention is described in detail below referring to FIG. 2, FIG. 5 and FIGS. 6A and 6B.

Figure 5:
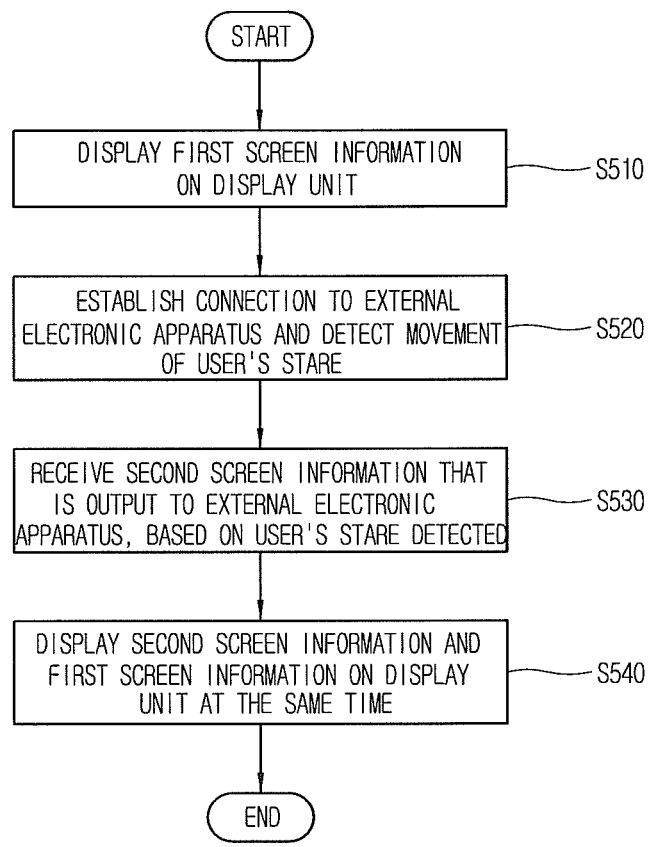
FIG. 5 is a flowchart for describing a method of controlling the mobile terminal according to the embodiment of the present invention.
Figure 6A:
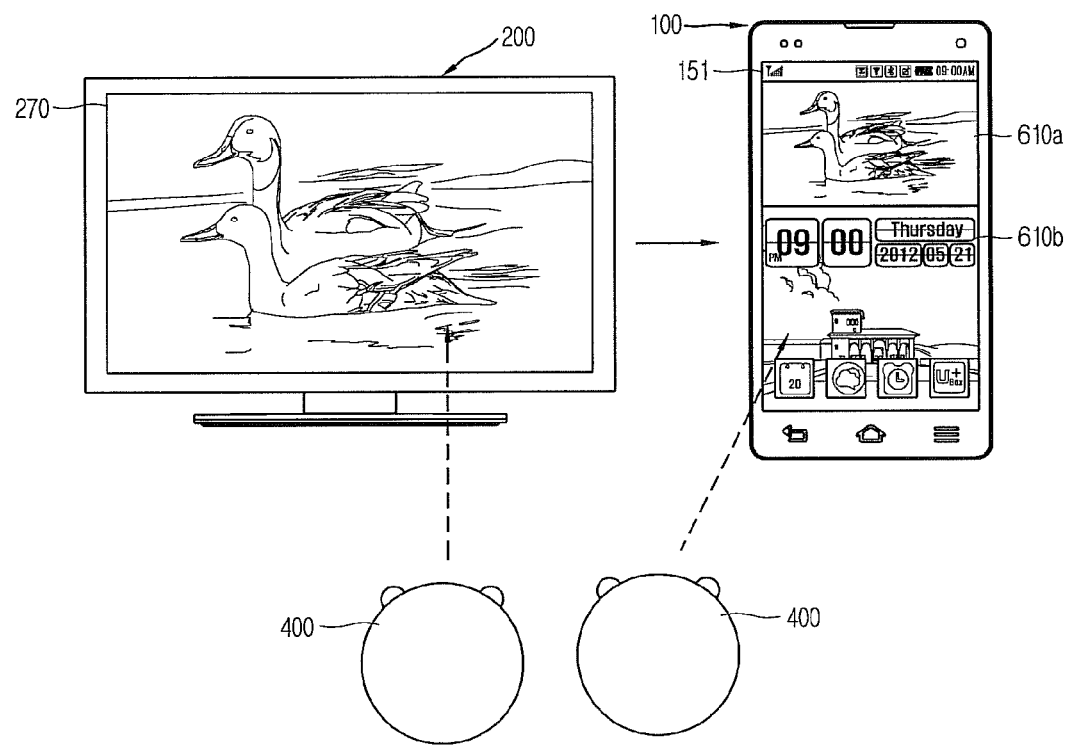
FIGS. 6A and 6B are diagrams illustrating the method of controlling the mobile terminal in FIG. 5.
Figure 6B:
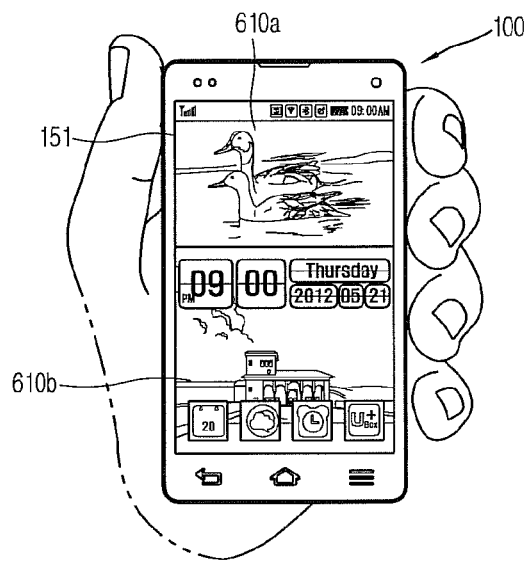
Figure 6B:
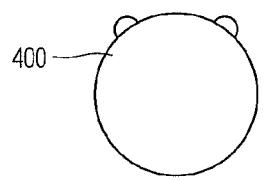
Figure 6B:
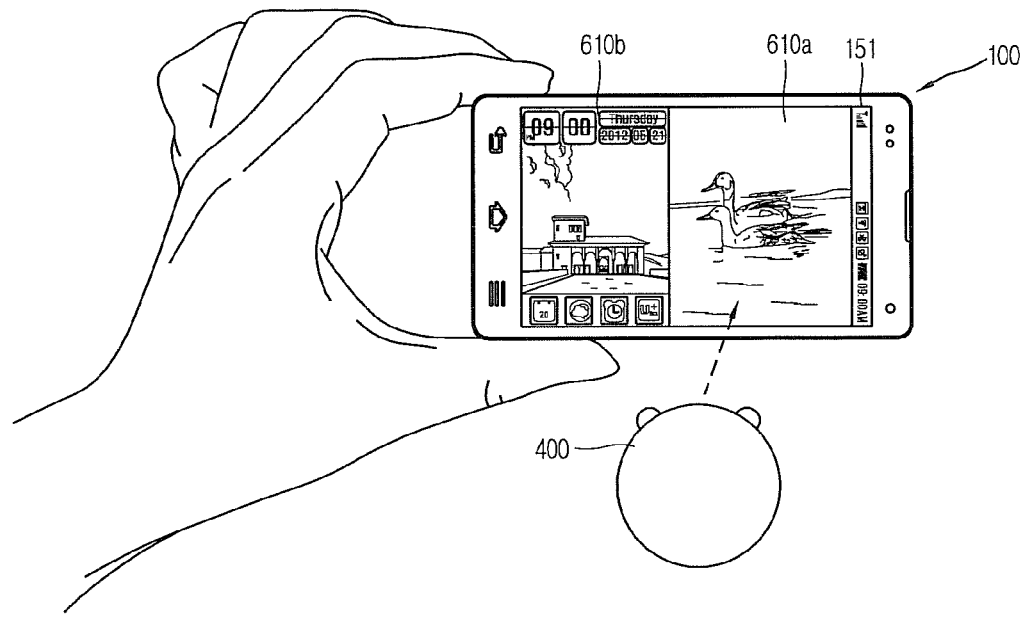

In this context, FIG. 5 is a flowchart for describing a method of operating the mobile terminal according to the embodiment of the present invention, and FIGS. 6A and 6B are diagrams illustrating the method of operating the mobile terminal in FIG. 5.

Referring to FIG. 5, the mobile terminal 100 according to the embodiment of the present invention outputs first screen information on the display unit 151 (S510).

The first screen information here is content such as a page including an image or a text, a web page, an E-mail, an E-document, and social network service (SNS).

In addition, for example, the first screen information includes at least one object, such as an icon, a widget, a thumbnail image, and an execution menu of an application.

The mobile terminal 100, for example, is connected to at least one external electronic apparatus 200, by using the wireless connection standards, such as digital living network alliance (DLNA) guidelines, Wi-Fi standards, Wi-Fi Direct standards and Bluetooth standards.

When the mobile terminal 100 and the external electronic apparatus 200 are connected to each other in this manner, the user tracking unit 120 of the mobile terminal 100 detects that the user's stare with respect to the connected external electronic apparatus 200 is moved to within the predetermined range with the display unit 151 serving as the reference (S520).

Specifically, the user tracking unit 120 may detect a movement of the user's stare, based on a first signal that corresponds to whether or not to detect a user's eye or not, which is received from the external electronic apparatus 200 connected through the wireless communication unit 110, and a second signal that corresponds to whether or not to detect the user's eye, which is detected by using at least one sensor provided to the mobile terminal 100, for example, the camera 121, the microphone 122 and/or an infrared light sensor 123.

To do this, the external electronic apparatus 200 connected to the mobile terminal 100 searches the user's eye by using a camera (not illustrated) and/or a sensor installed on the external electronic apparatus 200 and transmits the result of the search through the wireless communication unit 110 of the mobile terminal 100, successively, or at a predetermined time intervals.

For example, when the user's eye is searched by the connected external electronic apparatus 200, the mobile terminal 100 receives a first wireless signal, and when the user's eye is searched by the connected external electronic apparatus 200, the mobile terminal 100 receives a second wireless signal distinguishable from the first signal.

On the other hand, the signal received from the external electronic apparatus 200 is transferred to the controller 180, and it is determined whether or not the user's eye is searched. The controller 180 provides the user tracking unit 120 with the result of the determination corresponding to the received wireless signal.

In addition, the user tracking unit 120 includes an eye search unit (not illustrated). The eye search unit searches the user's eye by using a camera 221 and/or the infrared light sensor 123. Specifically, infrared light is emitted from the infrared light sensor 123, and the infrared light reaches a user's retina that is present within a predetermined view range with the display unit 151 serving as a reference and reflects from the user's retina. The reflected infrared light is incident back on the eye search unit. Subsequently, the eye search unit tracks the user's stare by using the reflected infrared light and the image captured by camera 121.

By combining the wireless signal received from the connected external electronic apparatus 200 and the result of performing the search of the user's eye in the mobile terminal 100 in this manner, the mobile terminal 100 recognizes that the stare of the user viewing the screen information displayed on the external electronic apparatus 200 is moved to within the display unit 151 of the mobile terminal 100 serving as the reference. The result of this combination is performed by the user tracking unit 120 or by the controller 180 and is transferred to the user tracking unit 120.

The mobile terminal 100 receives second screen information that is output to the connected external electronic apparatus 200, based on the user's stare detected by the user tracking unit 120 (S530).

Specifically, when it is determined that the user's stare detected is moved from the connected external electronic apparatus 200 to the display unit 151 of the mobile terminal 100, the controller 180 requests the external electronic apparatus 200 to transmit the screen information being output, through the wireless communication unit 110. Then, in response to the request transmitted from the mobile terminal 100, the external electronic apparatus 200 transmits the screen information being currently output and items of information relating to the screen information to the mobile terminal.

The second screen information here is content such as a page including an image or a text, a web page, an E-mail, an E-document, and social network service (SNS) and is information relating to the broadcast. For example, if the connected external electronic apparatus 200 is a television set, the second screen information includes a broadcast signal corresponding to a ground channel and information relating to the broadcast.

In addition, along with the second screen information, the mobile terminal 100 further receives information relating to the second screen information, for example, sound information corresponding to the second screen information and control information necessary to control the second screen information.

When the second screen information is received from the connected external electronic apparatus 200 in this manner, the controller 180 displays the received second screen information on at least one region of the display unit 151, along with the first screen information (S540).

To do this, the display unit 151 may be divided into a first region and a second region distinguishable from the first region. In addition, when the user's stare detected by the user tracking unit 120 is moved to within the predetermined range with the display unit 151 serving as the reference, the controller 180 may display the first screen information on the first region of the display unit 151 and may display the second screen information on the second region.

In addition, the controller 180 outputs the second screen information to one part of the region to which the first screen information is output, in such a manner that the second screen information overlaps with the one part of the region, and outputs the second screen information on a region obtained by reducing the region to which the first screen information is output.

For example, referring FIG. 6A, when it is detected that the stare of the user 400 is moved from the graphic display apparatus 200 connected to the mobile terminal 100 to the display unit 151 of the mobile terminal 100, the controller 180 outputs a broadcast screen 270 that is output to the graphic display apparatus 200, to one region of the mobile terminal 100, for example, the upper region. That is, a broadcast screen 610a that is output to the graphic display apparatus 200 is displayed on the upper region of the display unit 151, and a content screen 610b is displayed on the lower region of the display unit 151 at the same time. In addition, the controller 180 receives the sound information corresponding to the broadcast screen that is displayed on the display unit 151 and outputs the sound to an audio output module 152.

The region of the display unit 151 of the mobile terminal 100, on which the broadcast screen 610a is displayed and the region on which the content screen 610b is displayed are set in various manners.

As one example, the controller 180 sets the regions on which the first screen information and the second screen information are displayed, based on the touch input. Specifically, the controller 180 may designate the second region, based on the touch input by the user and displays the second screen information on the designated second region. For example, when the first screen information is displayed, and the touch input is applied to a first position on the display unit 151, the controller 180 outputs the second screen information on a region in a predetermined range of which the center is the first position, in such a manner that the second screen information overlaps with the region in the predetermined range.

As another example, the controller 180 sets the regions on which the first screen information and the second screen information are displayed, based on the user's stare and an inclination of the mobile terminal. To do this, the mobile terminal 100 further may include an inclination detection unit (not illustrated) for detecting the inclination of the mobile terminal. The controller 180 may determine the second region on which the second screen information is displayed, based on the user's stare detected by the user tracking unit 120 and the inclination of the mobile terminal detected by the inclination detection unit.

For example, referring to FIG. 6B, when the result of detecting the inclination of the mobile terminal is that the mobile terminal is in the longitudinal direction, the setting is provided in such a manner that the broadcast screen 610a is displayed on the upper portion of the display unit 151 and the content screen 610b is displayed on the lower portion of the display unit 151. In addition, for example, when the mobile terminal 100 is in the transverse direction, and the user's stare is toward the left-handed region of the display unit 151, the setting is provided in such a manner that the broadcast screen 610a is displayed on a region on which the user's stare stays and the content screen 610b is displayed on a region facing the region on which the broadcast screen 610a is displayed.

As another example, the controller 180 changes the regions on which the first screen information and the second screen information are displayed, based on the movement of the user's stare. Specifically, if it is detected that the user's stare stays on the first position on the display unit 151, the controller 180 may cause the second screen information to be displayed on a region of which the center is the first position.

On the other hand, in a state where the first screen information and the second screen information are output on the display unit 151 of the mobile terminal 100 at the same time, when the user's stare stays on the region on which the second screen information is displayed, for a predetermined time, the controller 180 causes the second screen information to be displayed on all the regions of the display unit 151.

On the other hand, in a state where the first screen information and the second screen information are output on the display unit 151 of the mobile terminal 100 at the same time, when the user's stare stays on the region on which the second screen information is displayed, for a predetermined setting time, the controller 180 performs control in such a manner as to cause the second screen information to disappear form the display unit 151. Accordingly, only the earlier-displayed first screen information is displayed on the display unit 151 of the mobile terminal 100.

As described above, in the mobile terminal according to the embodiment of the present invention, the content screen displayed on the external electronic apparatus connected to the mobile terminal is output along with the screen displayed on the mobile terminal, based on the user's stare, and thus the screens displayed on the multiple apparatus can be viewed or used in the one apparatus at the same time.

Figure 7A:
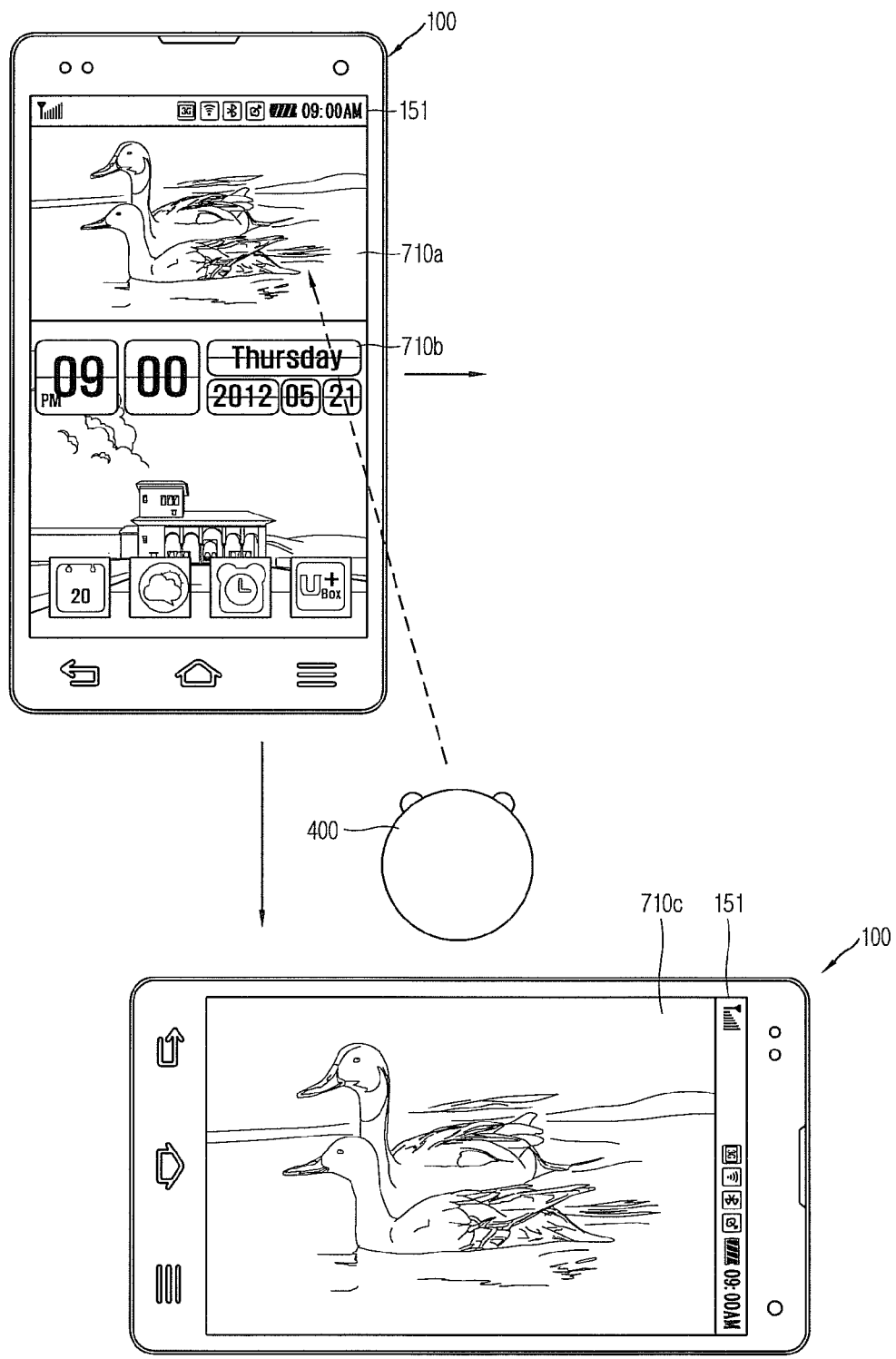
FIGS. 7A to 7C are diagrams for describing methods in each of which the screen information displayed on the external electronic apparatus connected to the mobile terminal according to the embodiment of the present invention is displayed on the mobile terminal.
Figure 7B:
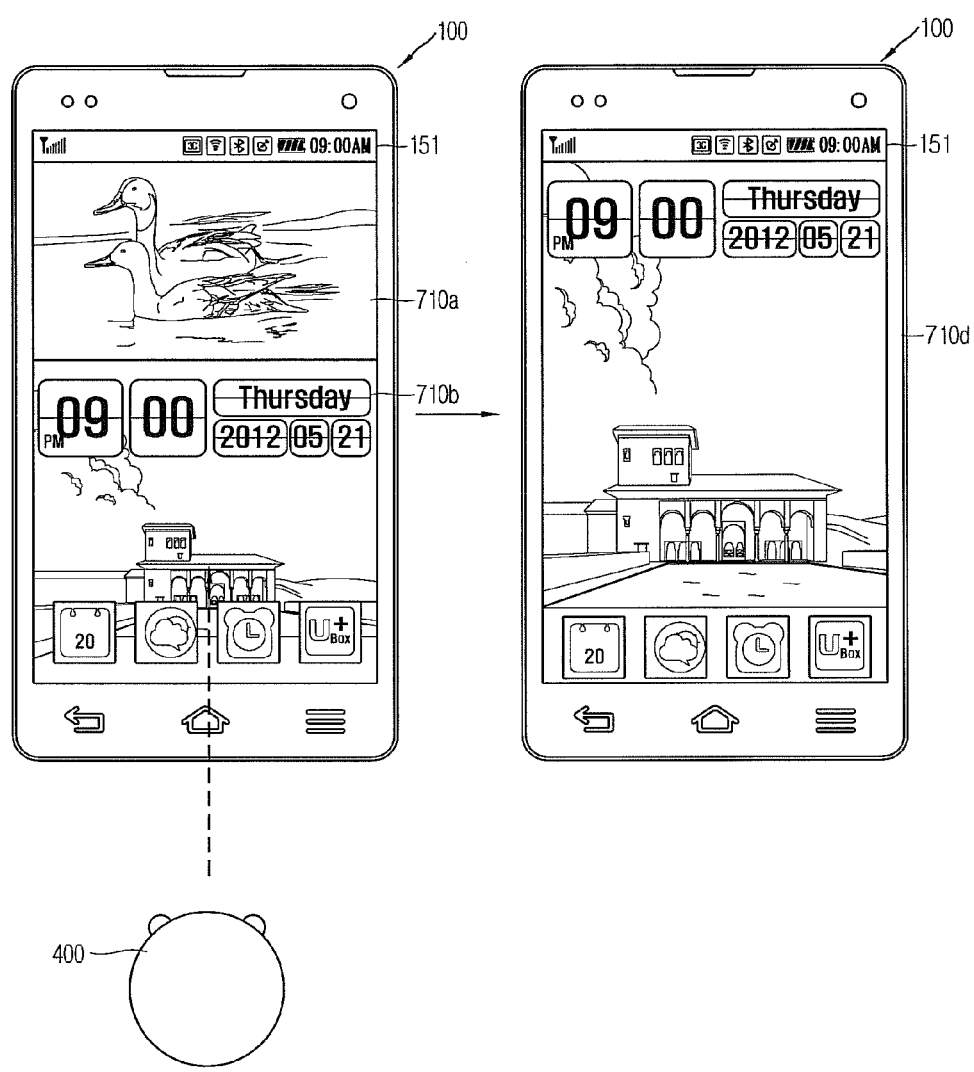
Figure 7C:
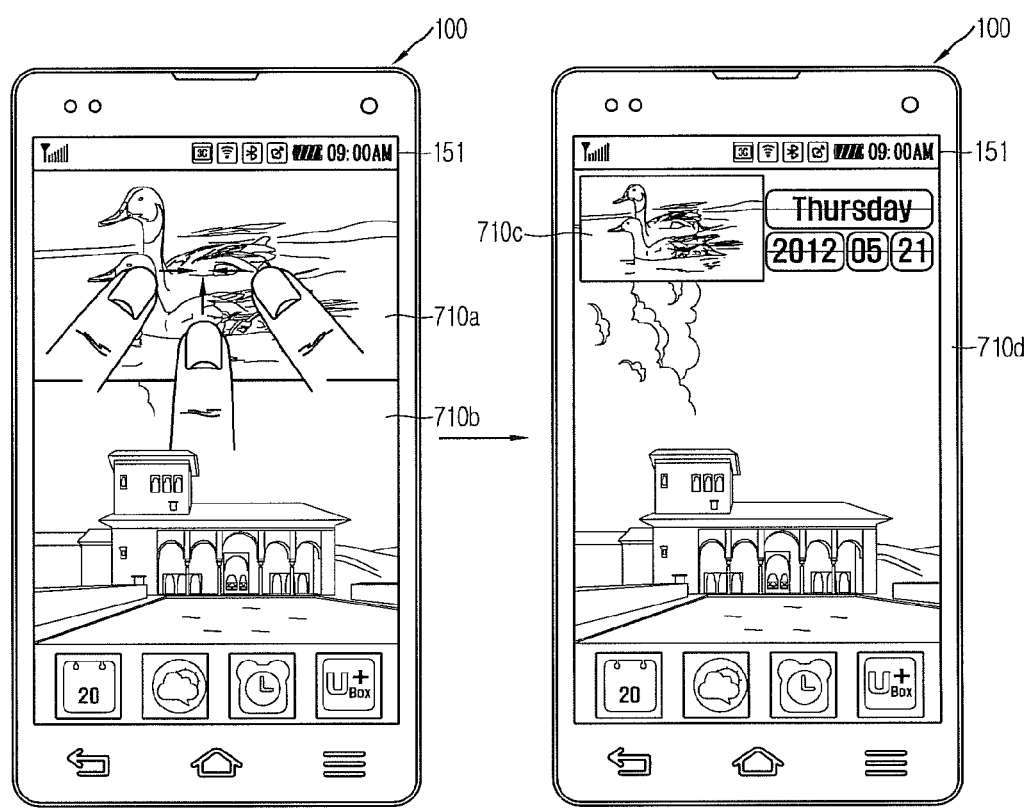

Referring to FIG. 2 and FIGS. 7A to 7C, various methods are described below in each of which the second screen information is displayed on the display unit 151 of the mobile terminal 100. In this context, FIGS. 7A to 7C are diagrams for describing the methods in each of which the screen information displayed on the external electronic apparatus connected to the mobile terminal according to the embodiment of the present invention is displayed on the mobile terminal. The mobile terminal 100 outputs the first screen information to the display unit 151.

The mobile terminal 100, for example, is connected to at least external electronic apparatus 200, by using the wireless connection standards, such as digital living network alliance (DLNA) guidelines, Wi-Fi standards, Wi-Fi Direct standards and Bluetooth standards.

When the mobile terminal 100 and the external electronic apparatus 200 are connected to each other in this manner, the user tracking unit 120 of the mobile terminal 100 detects that the user's stare with respect to the external electronic apparatus 200 is moved to within the predetermined range with the display unit 151 serving as the reference. The controller 180 receives the second screen information that is output to the connected external electronic apparatus 200, based on the user's stare detected by the user tracking unit 120, and displays the received second screen information on the display unit 151, along with the first screen information.

In a state where the first screen information and the second screen information are displayed on the display unit 151 at the same time in this manner, when the user's stare detected by the tracking unit 120 stays on the region on which the second screen information is displayed, for a predetermined time (for example, two seconds or more), the controller 180 may cause the second screen information to be displayed on all the regions of the display unit 151. That is, the first screen information displayed on the display unit 151 is caused to disappear or to be displayed in the background.

For example, referring FIG. 7A, in a state where a second screen information 710a is displayed on one region, for example, the upper region of the display unit 151 of the mobile terminal 100, and a first screen information 710b is displayed on a different region, for example, the lower portion, when a user 400 stares on the region to which the second screen information 710a is output, for a predetermined time, for example, for two seconds, the second screen information is displayed on all the regions of the display unit 151.

That is, screen-switching to a second screen information 710c is provided.

In addition, in a state where the first screen information and the second screen information are displayed on the display unit 151 at the same time, when the user's stare stays on the region to which the first screen information is output, for a predetermined time (for example, two seconds or more), the controller 180 may cause the second screen information to disappear from the display unit 151.

For example, referring to FIG. 7B, in a state where the second screen information 710a is displayed on one region, for example, the upper region, of the display unit 151, and the first screen information 710b is displayed on a different region, for example, the lower region, when the user 400 stares on the region to which the first screen information 710b is output, for a predetermined time, for example, for approximately 2 seconds or more, the first screen information is displayed on all the regions of the display unit 151 and the second screen information 710a disappears from the display unit 151. That is, the screen-switching a first screen information 710d is provided. In addition, when a first touch is applied to the region on which the second screen information is displayed, the controller 180 reduces the second screen information and displays the reduced second screen information. For example, when multiple short touch inputs are detected on the region on which the second screen information is displayed, the controller 180 displays reduces the second screen information and displays the reduced second screen information. On the other hand, when the second screen information is displayed on the region that distinguishes the second screen information from the first screen information, the first screen information is enlarged as much as the second image is reduced, and the enlarged first screen information is displayed.

According to another embodiment, when the first touch is applied to the region on which the second screen information is displayed, the first screen information may be caused to disappear from the display unit 151.

In addition, when a second touch is applied to the region on which the second screen information is displayed, the controller 180 may cause the second screen information to be displayed on all the regions of the display unit 151. For example, when a one-time short touch or a one-time long touch input is detected on the region on which the second screen information, the controller 180 enlarges the second screen information and displays the enlarged second screen information.

On the other hand, the first screen information is caused to disappear from the display unit 151 or is displayed in the background.

According to another embodiment, when the second touch is applied to the region on which the second screen information is displayed, the second screen information is caused to be enlarged by a predetermined size and thus the enlarged second screen information is displayed. The first screen information is caused to be reduced by the predetermined size and thus the reduced first screen information is displayed.

In addition, when a third touch is applied to the region on which the second screen information is displayed, the controller 180 may cause the second screen information to be reduced or enlarged corresponding to the direction in which the third touch is applied and the extent to which the third touch is dragged, and thus the reduced or enlarged second screen information is displayed.

For example, referring to FIG. 7C, in a state where the first screen information 710b and the second screen information 710a are displayed on the display unit 151 at the same time, when a touch and drag input of which starting points are two touch points on the second screen information 710a is detected and as illustrated, the multiple touch points are dragged closer to each other, the second screen information 710c is output that is reduced as much as a distance that the multiple touch points are dragged at the same time. At this time, when the sound information is present that corresponds to the second screen information 710c, a volume of sound information that is output to the audio output module 152 is decreased in such a manner that the volume corresponds to the screen being reduced.

On the other hand, although not illustrated in the drawings, when the touch and drag input of which starting points are two touch points on the second screen information 710a is detected and the multiple touch points are dragged farther away from each other, the second screen information 710a is enlarged as much as a distance that the multiple touch points are dragged at the same time. In addition, according to another embodiment, when the third touch is applied to the second screen information 710a, the second screen information 710a is zoomed in or zoomed out around a specific object included in the second screen information 710a.

A minimum value (for example, disappearance) is predetermined at which the second screen information is reduced and the reduced second screen information is displayed on the display unit 151, and a maximum value (all the regions of the display unit 151) is predetermined at which the second screen information is enlarged and the enlarged second screen information is displayed.

In addition, if the second screen information is reduced to the minimum value, the controller 180 outputs a thumbnail corresponding to the second screen information or a floating window including the thumbnail. When a predetermined-type touch is detected on the thumbnail or floating window that is output in this manner, the controller 180 displays the second screen information back on one region of the display unit 151.

In addition, in a state where the first second screen information and the second screen information are displayed on the display unit 151 in the same time, when the predetermined-type touch input is applied to the region on which the second screen information is displayed, the controller 180 performs the control in such a manner that the display of the second screen information disappears along a track of the touch input and an object, for example, an execution icon of an application, appears that is earlier displayed on the first screen information.

Figure 8:
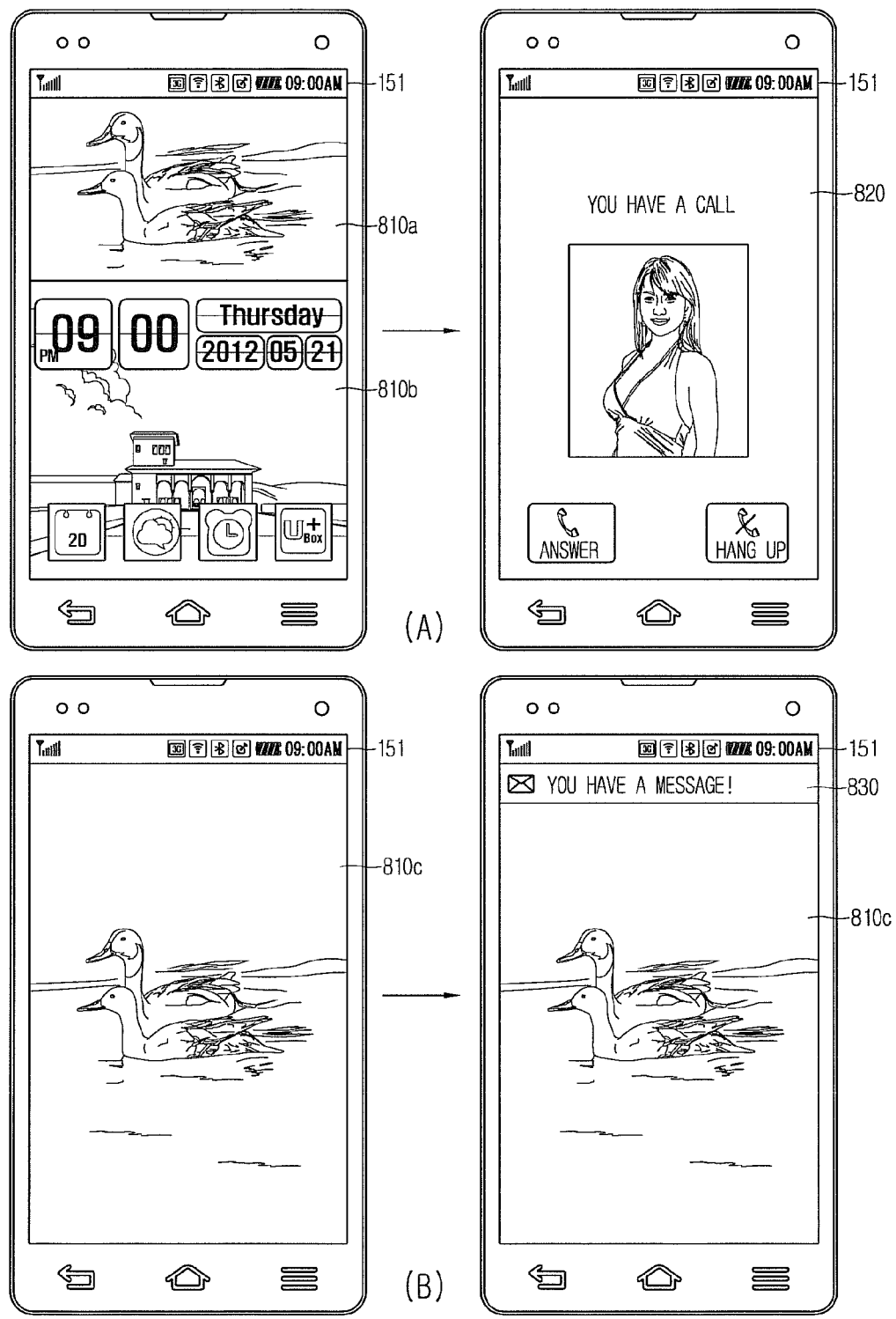
FIG. 8 is a diagram for describing a processing method that is used when the event occurs in the mobile terminal in a state where the screen information, output to the external electronic apparatus connected to the mobile terminal according to the embodiment of the present invention, is displayed on the mobile terminal.

Referring to FIG. 2 and FIG. 8, a processing method is described below that is used when an event occurs in a state where the first screen information and the second screen information are displayed on the display unit 151 of the mobile terminal 100 at the same time.

In this context, FIG. 8 is a diagram for describing the processing method that is used when the event occurs in the mobile terminal in a state where the screen information, output to the external electronic apparatus connected to the mobile terminal according to the embodiment of the present invention, is displayed on the mobile terminal.

When the event occurs in a state where the second screen information received from the connected external electronic apparatus 200 is together displayed on the display unit 151, the controller 180 may switch the first screen information and the second screen information to screen information relating to the event that occurs, or may output an icon for switching the first screen information and the second screen information to the screen information, to the display unit 151.

Referring FIG. 8 (*a*), in a state where a first screen information 810*b* and a second screen information 810*a* are displayed on the display unit 151 of the mobile terminal 100 at the same time, for example, when a call is received, switching to a screen 820 for entering a telephonic conversation mode occurs. When the telephonic conversation mode is entered, and a telephonic conversation is completed, switching to a state where the previous screens, that is, the first screen information 810*b* and the second screen information 810*a* are displayed back on the display unit 151 at the same time is provided.

In addition, for example, referring to FIG. 8 (*b*), in a state where a second screen information 810*c* is displayed on all the regions of the display unit 151 of the mobile terminal 100, when an SMS message is received, an indicator icon 830 for switching to a screen of the received SMS message is output to one region, for example, the upper end of the display unit 151. When the touch is applied to the indicator icon 830 that is output, the corresponding application is executed, and thus the content of the received SMS message is read.

Figure 9A:
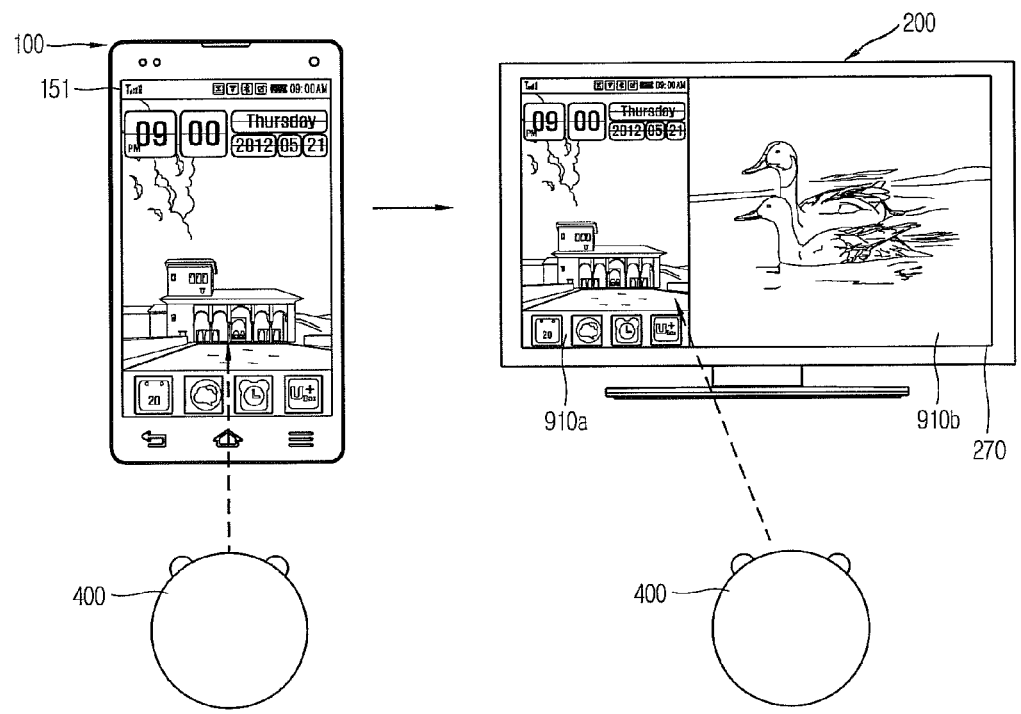
FIGS. 9A and 9B are diagrams for describing a method in which the screen information that is displayed on the mobile terminal is output to the external electronic apparatus connected to the mobile terminal according to the embodiment of the present invention.
Figure 9B:
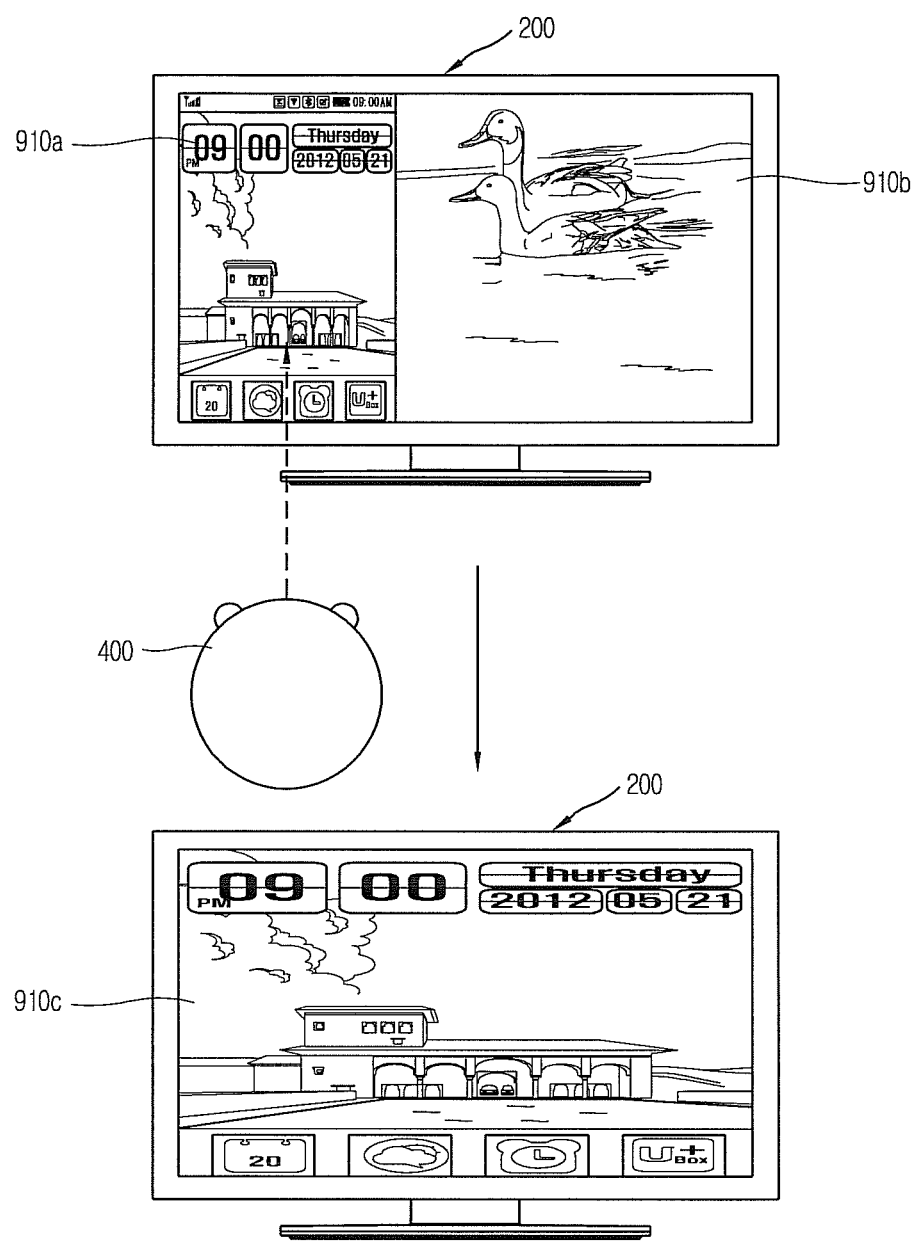

Referring to FIG. 2 and FIGS. 9A and 9B, a method is described below in which in a case where the user's stare is moved back to the external electronic apparatus 200 connected to the mobile terminal 100, the screen that is displayed on the mobile terminal 100 and the screen that is displayed on the external electronic apparatus 200 are displayed on the external electronic apparatus 200 at the same time. In this context, FIGS. 9A and 9B are diagrams for describing the method in which the screen information that is displayed on the mobile terminal is output to the external electronic apparatus connected to the mobile terminal according to the embodiment of the present invention.

The first screen information is output to the display unit 151 of the mobile terminal 100, and the second screen information is output to the external electronic apparatus 200 connected to the mobile terminal 100.

The user tracking unit 120 of the mobile terminal 100 detects that the user's stare is moved to within the predetermined range with the display unit 151 serving as the reference and transmit the result of the detection to the connected external electronic apparatus 200. The connected external electronic apparatus 200 detects that the user's stare is moved and stays at the screen of the external electronic apparatus 200 for a predetermined time, for example, for five seconds or more, by using a wireless signal associated with the user's stare, which is received from the mobile terminal 100, and a sensor provided on the external electronic apparatus 200.

When it is detected in this manner that the user's stare within the predetermined range with the display unit 151 serving as the reference is moved to the screen of the connected external electronic apparatus 200, the controller 180 transmits the first screen information to the connected external electronic apparatus 200. Then, the external electronic apparatus 200 outputs the received first screen information, along with the second screen information.

For example, referring to FIG. 9A, the first screen information, for example, the content screen, is displayed on the display unit 151 of the mobile terminal 100, and when the stare of the user 400 that is detected within the predetermined range with the display unit 151 serving as the reference is moved to the external electronic apparatus 200, a first screen information 910*a* and a second screen information 910*b* are displayed on the display unit 270 of the external electronic apparatus 200 at the same time. Referring to FIG. 9B, in a state where the first screen information 910*a* and the second screen information 910*b* are displayed on the display unit 270 of the external electronic apparatus 200 at the same time in this manner, when the user's stare stays on the region on which the first screen information 910*a* is displayed, the first screen information 910*a* is displayed on all the regions of the display unit 270. That is, the screen-switching to the first screen information 910*c* is provided.

As described above, even though the stare of the user 400 is moved from a first apparatus to a second apparatus and moved from the second apparatus back to the first apparatus, the screen that is output to the first apparatus and the screen that is output to the second apparatus are displayed at the same time in the one apparatus on which the user's stare stays. This removes an inconvenience that causes the user to view the multiple apparatus alternatively.

Figure 10A:
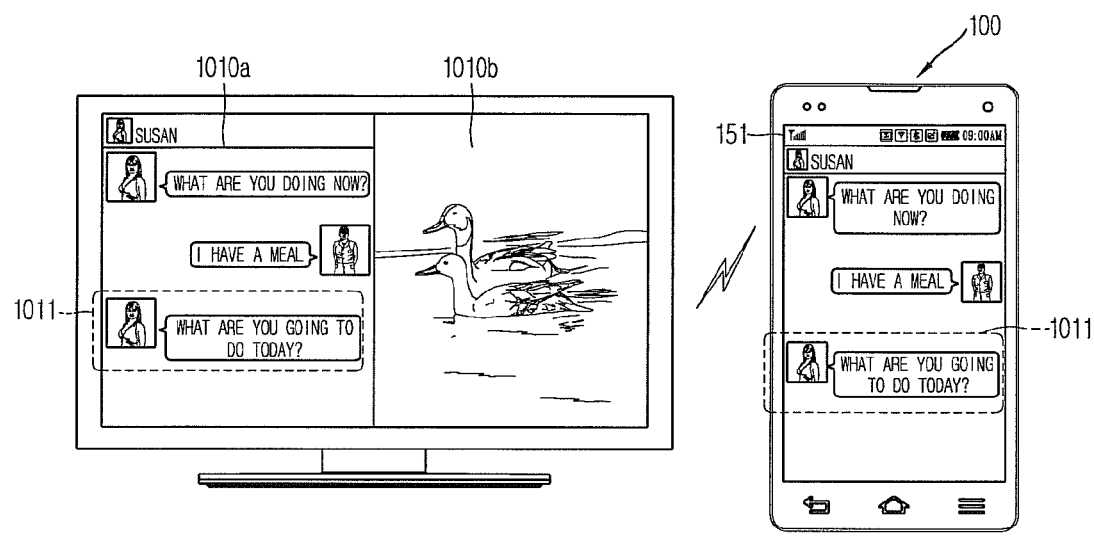
Figure 10A:
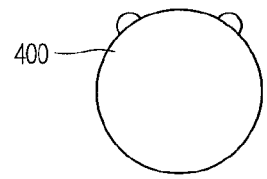

Referring FIG. 2 and FIGS. 10A and 10B, an operating method is described below that is used to process the event that occurs, in the external electronic apparatus when the event occurs on the mobile terminal in a state where the first screen information and the second screen information are displayed on the external electronic apparatus 200 connected to the mobile terminal 100. In this context, FIGS. 10A and 10B are diagrams for the operating method that is used to process the event that occurs, in the external electronic apparatus 200 when the event occurs in the mobile terminal while viewing the screen information displayed on the external electronic apparatus connected to the mobile terminal according to the present invention.

The first screen information is output to the display unit 151 of the mobile terminal 100, and the second screen information is output to the external electronic apparatus 200 connected to the mobile terminal 100. When it is detected that the user's stare within the predetermined range with the display unit 151 serving as the reference is moved to the screen of the connected external electronic apparatus 200, the connected external electronic apparatus 200 may output the first information that is received from the mobile terminal 100, along with the second screen information.

When in a state where the first screen information is transmitted to the connected external electronic apparatus 200 and the first screen information and the second screen information are displayed on the external electronic apparatus 200 connected to the mobile terminal 100, the event occurs in the mobile terminal 100, the controller 180 may determine a range of the first screen information to be output to the external electronic apparatus 200 according to a control mode, and transmits the first screen information in the determined range to the external electronic apparatus 200.

Specifically, when the control mode is a normal mode, the controller 180 transmits event data corresponding to the event to the connected external electronic apparatus 200.

For example, referring to FIG. 10A, when in a state where a first screen information 1010a and a second screen information 1010b are displayed at the same time on the external electronic apparatus 200 connected to the mobile terminal 100, an SMS message telling, for example, "WHAT ARE YOU GOING TO DO TODAY," is received (1011), the same content as that of the received SMS message, that is, "What are you going to do today," is displayed on the region on which the first screen information 1010a is displayed, in the connected external electronic apparatus 200 as well. In addition, when the control mode is a user protection mode, the controller 180 transmits a notification message telling an occurrence of the event, for example, only a notification message telling an arrival of a message and a notification message telling an arrival of an SMS message, to the connected external electronic apparatus 200. That is, the sender and the content of the message are not transmitted to the external electronic apparatus 200. Here, the notification message corresponding to the event that occurs may be selected from the pre-created messages stored in advance in the memory 160.

On the other hand, when the connected external electronic apparatus 200 is additionally connected to the different electronic apparatus and the stares of the multiple users stay on the screen of the connected external electronic apparatus 200, the controller 180 may automatically enter the user protection mode. For example, referring FIG. 10B, assume that the external electronic apparatus 200 connected to a mobile terminal 100a is additionally connected to a different mobile terminal 100b, and furthermore while the user of each of the mobile terminals 100a and 100b views the second screen information, for example, the broadcast screen, which is output to the external electronic apparatus 200, the mobile terminal 100b receives an SMS message telling, for example, "What are you going to do today," (1011). In this case, only a notification message 1020 telling an arrival of the SMS message is displayed on the connected electronic apparatus 200.

That is, when the items of screen information displayed on the multiple mobile terminals 100a and 100b connected to the external electronic apparatus 200 are all displayed on the screen of the external electronic apparatus 200, there are concerns that the display of the screen of the external electronic apparatus 200 might be exceedingly complex and privacy of each user might be invaded. For this reason, the minimum information relating to the event that occurs in the mobile terminal is caused to be displayed.

When a predetermined time elapses, the popping-up message associated with the event is caused to disappear from the screen of the external electronic apparatus 200.

As illustrated above, if in a state where the first screen information and the second screen information are displayed at the same time on the external electronic apparatus connected to the mobile terminal, the event occurs in the mobile terminal, an output range of the data associated with the event that is displayed on the second screen information is caused to vary according to the control mode. Thus, the protection of privacy of the user and the simple display of the screen are made possible.

Figure 11A:
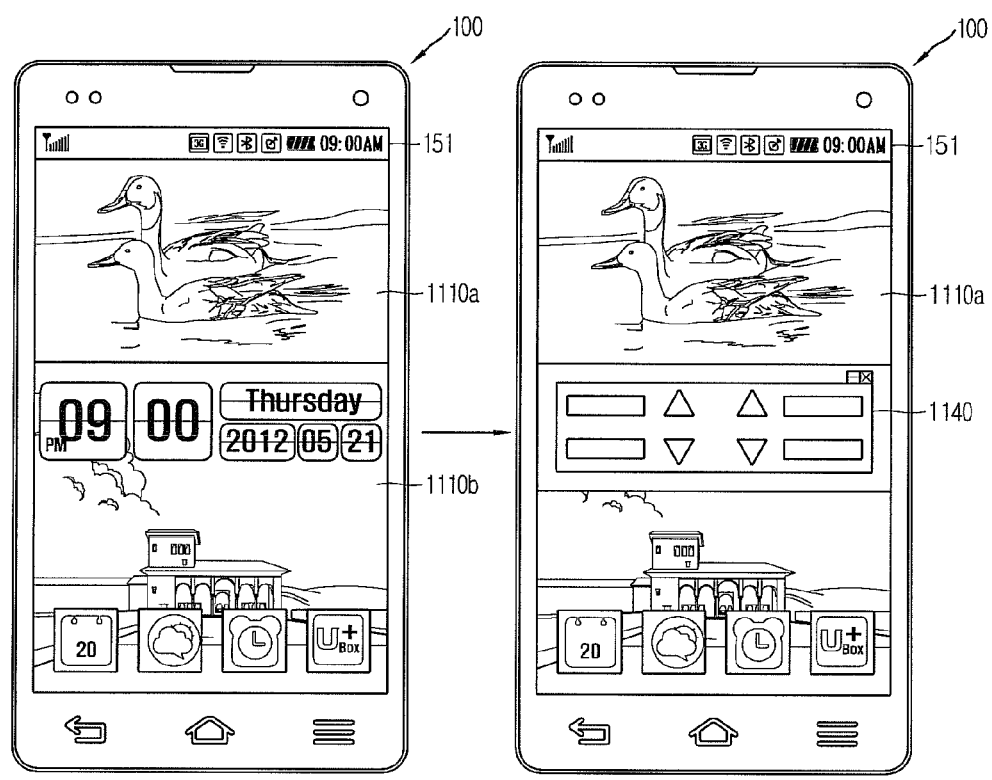
FIGS. 11A and 11B are diagrams for describing an operating method that is used to remotely control the screen information that is output to each of the mobile terminal according to the embodiment of the present invention and the external electronic apparatus connected to the mobile terminal.
Figure 11B:
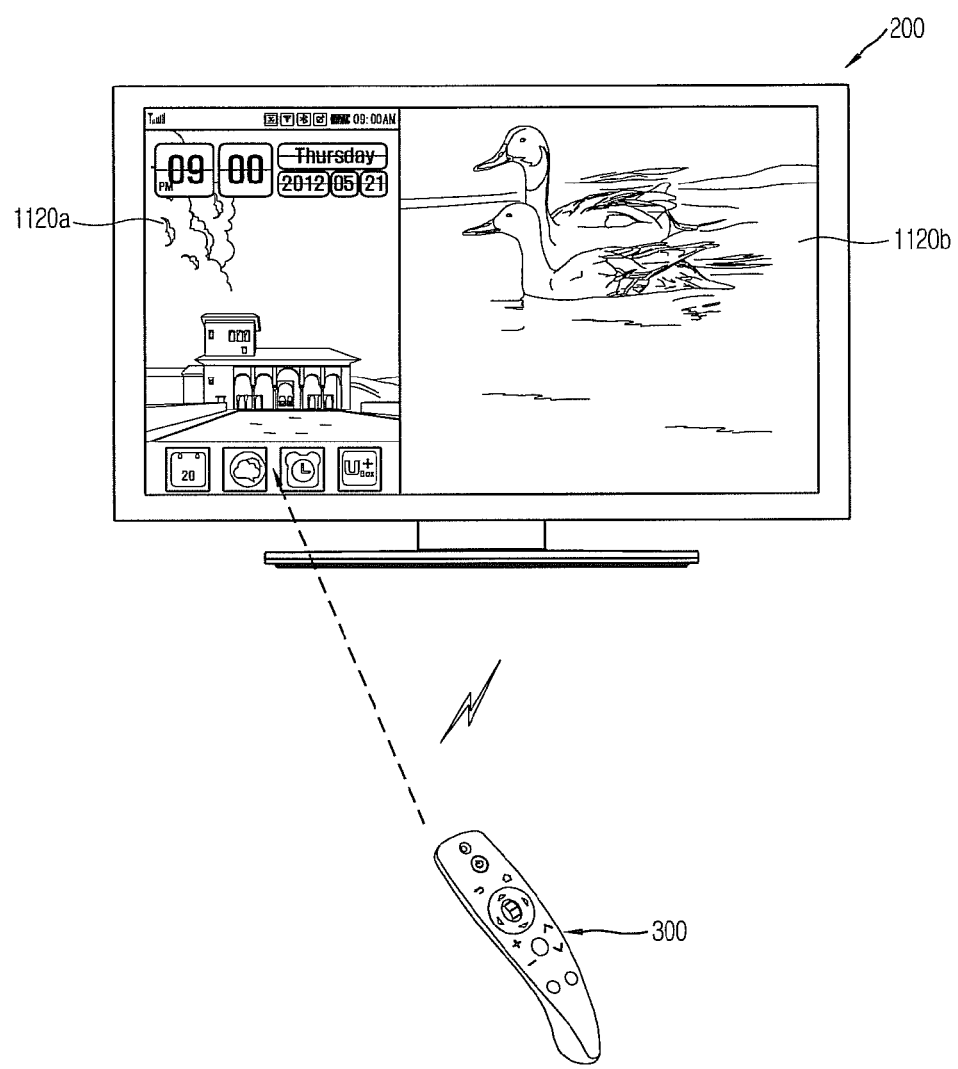

Referring to FIG. 2 and FIGS. 11A and 11B, two operating methods are described below. In one operation method, the first screen information and the second screen information that are displayed on the display unit 151 of the mobile terminal 100 at the same time are controlled. In the other method, the first screen information and the second screen information that are displayed on the screen of the external electronic apparatus 200 at the same time are controlled.

In this context, FIGS. 11A and 11B are diagrams for describing the operating methods that are used to remotely control the screen information that is output to the external electronic apparatus connected to the mobile terminal.

When in a state where the second screen information (the screen displayed on the external electronic apparatus) is displayed on the display unit 151 of the mobile terminal 100, the user input with respect to the second screen information meets a predetermined condition, the controller 180 may execute at least one remote control function associated with the second screen information.

The predetermined condition here is configured based on one of the touch input with respect to a menu key that pops on the screen, the voice signal input, the predetermined-type user gesture, collected items of information on the user's stare, and the touch input with respect to the second screen information. As one example, when a flicking touch input is applied to the second screen information displayed on the display unit 151 in a first direction, the menu key associated with the second screen information pops on one region of the display unit 151. More specifically, if the external electronic apparatus 200 is a television set connected to the mobile terminal 100, and the second screen information is broadcast information, for example, the popping-up menu key includes a channel change key, a volume control key, a view reservation key, a home key, and a setting key. In addition, if the menu key is a hard key already provided on the mobile terminal 100, with respect to the corresponding hard key, the controller 180 deactivates a function associated with control of the mobile terminal 100 and activates a function associated with broadcast information control of the external electronic apparatus 200.

As another example, when even though no user input is applied, the predetermined time (for example, ten seconds) is exceeded in a state where the second screen information is displayed on the display unit 151 of the mobile terminal 100, the controller 180 causes the menu key for remotely controlling the second screen information to pop up automatically.

The user can perform remote control on the second screen information by operating the popping-up menu key. For example, according to the touch input applied to the popping-up menu key, the controller 180 changes the region on which the second screen information is displayed (a screen movement), switches the second screen information to the different broadcast screen (for example, a channel change), adjusting a volume of a sound source, making viewing reservations, or performing tagging on the currently-displayed screen information. In addition, according to the touch input applied to the popping-up menu, the controller 180 outputs the image or text information relating to the corresponding control function to one region of the display unit 151.

For example, referring to FIG. 11A, when in a state where a first screen information 1110b and a second screen information 1110a are output to the display unit 151 of the mobile terminal 100, the touch input is applied to a specific region 1140, the controller 180 outputs the second screen information 1110a that is output, and menu keys in the specific region 1140 for controlling information relating to the second screen information 1110a. When an output state of the second screen information 1110a is changed according to the operation of the menu keys in the specific region 1140 that are output, a screen state of the external electronic apparatus 200 is changed together corresponding to this change. That is, from the mobile terminal 100, the remote control is performed while viewing the screen displayed on the external electronic apparatus 200.

On the other hand, when in a state where the first screen information (the screen displayed on the mobile terminal 100) is displayed on the screen of the external electronic apparatus 200, the user input with respect to the first screen information meets a predetermined condition, the external electronic apparatus 200 performs at least one remote control function associated with the first screen information.

The predetermined condition here may be configured based on any one of the touch input with respect to the menu key that pops on the screen, the voice signal input, the predetermined-type user gesture, collected items of information on the user's stare, the touch input with respect to the first screen information, and the input signal that is input through the use of the external input device 300.

As one example, when the flicking touch input is applied to the first screen information displayed on the screen of the external electronic apparatus 200 in the first direction, the menu key for executing the control function associated with the first screen information pops on one region of the screen.

The user can input the control command for performing the control function, for example, screen movement, application execution, text input, call connection establishment and the like by operating the popping-up menu key. As another example, the control command for performing the control function associated with the first screen information displayed on the external electronic apparatus 200 is according to a voice command. For example, when the user says "MEMO NOTE," a memo application is executed, and the first screen information is switched to the execution screen of the memo application. As another example, a pointer signal is generated as a result of detecting the touch to a specific key provided on the external input device 300 that remotely controls the external electronic apparatus 200, or detecting the movement of the external input device 300. The pointer signal is transmitted to the external electronic apparatus 200. The control functions associated with the first screen information, described above, are performed according to the transmitted pointer signal.

For example, referring to FIG. 11B, in a state where a first screen information 1120a and a second screen information 1120b are output to the external electronic apparatus, for example, the graphic display apparatus 200, which is connected to the mobile terminal 100, the user can input the control command for executing the control function associated with the first screen information 1120a by using the external input device 300. At this time, with respect to a specific key that is provided, the external input device 300 deactivates the function associated with the control of the second screen information and activates the function associated with the control of the first screen information. The pointer displayed on the screen of the graphic display apparatus 200 is moved in response to upward and downward, left and right, back and forth movements of or rotation of the external input device 300 by the user, and according to this movement, the objects included in the first screen are selected. For example, an execution icon of a specific application is selected.

Figure 12:
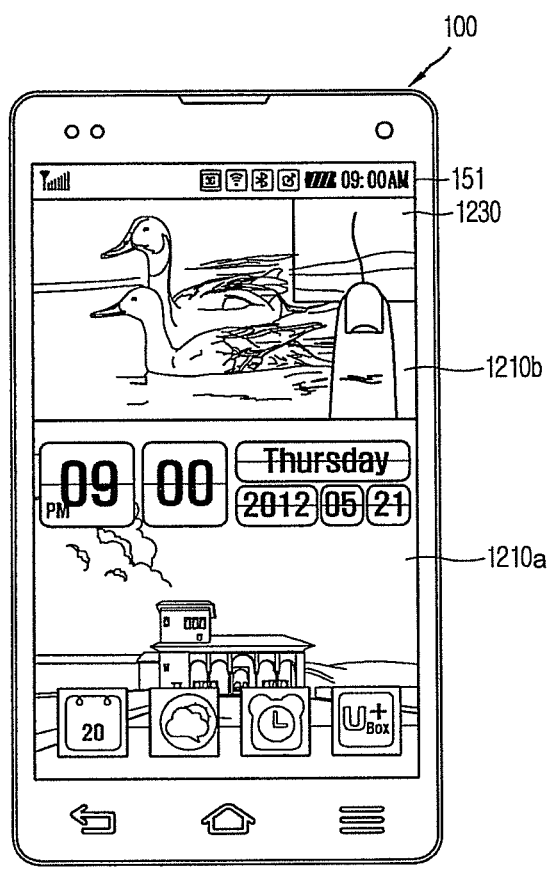
FIG. 12 is a diagram for describing an operating method in which in a state where the screen information, output to the external electronic apparatus connected to the mobile terminal according to the embodiment of the present invention, is displayed on the mobile terminal, predetermined information is input into the screen information according to a touch input.

As described above, according to the embodiment, the multiple screens that are displayed on their respective apparatuses are output to the one apparatus, and the control and the remote control, associated with each of the multiple screens are also executed in the one apparatus. This provides the user with a practical convenience in controlling the multiple apparatus. Referring to FIGS. 2 and 12, an operating method is described below that is used to input predetermined information into the second screen information in a state where the first screen information and the second screen information are output to the display unit 151.

In this context, FIG. 12 is a diagram for describing the operating method in which in a state where the screen information, output to the external electronic apparatus connected to the mobile terminal according to the embodiment of the present invention, is displayed on the mobile terminal, the predetermined information is input into the screen information according to the touch input.

In a state where the first screen information and the second screen information are displayed on the display unit 151, the controller 180 may enter an input mode in which the input into the second screen information is ready.

When going into the mode in which the input into the second screen information is ready, the controller 180 may switch at least one part of the region on which the second screen information is displayed, to a region into which the information is input. When the user inputs the predetermined information into the region that results from the switching in this manner, the controller 180 may display the information that is input, on the second screen information in such a manner that the information overlaps with the second screen information.

Here, the information that is input may be text information associated with the second screen information or may be an image or a text that, although not associated with the second screen information, is input to display an entertaining effect.

For example, referring FIG. 12, in a state where a first screen information 1210a and a second screen information 1210b are displayed on the display unit 151 at the same time, when the predetermined-type touch input (for example, a short touch with respect to the upper left part of the region on which the second screen information 1210b is displayed) is applied to a specific region, a region 1230 is displayed into which the predetermined information is displayed. When the corresponding region 1230 is displayed, the user can input the predetermined information into the corresponding region 1230 by applying a hand touch or by pushing on an input key that pops up. At this time, the information that is input is displayed on the second screen information 1210b in such a manner as to overlap with the second screen information 1210b, but according to another embodiment, a background screen of the corresponding region 1230 is selected by applying the user input. On the other hand, the controller 180 may transmit the second screen information 1210b into which the predetermined information is input in this manner, to the external electronic apparatus 200 or the different mobile terminal.

In addition, although not illustrated, the user can set a writing instrument with which to input the predetermined information into the corresponding region 1230. For example, if the writing instrument is set to an "eraser," when the touch input is applied to the corresponding region 1230, the controller 180 causes one part of the second screen information 1210b to disappear from the display unit 151 along the track of the touch input.

Figure 13A:
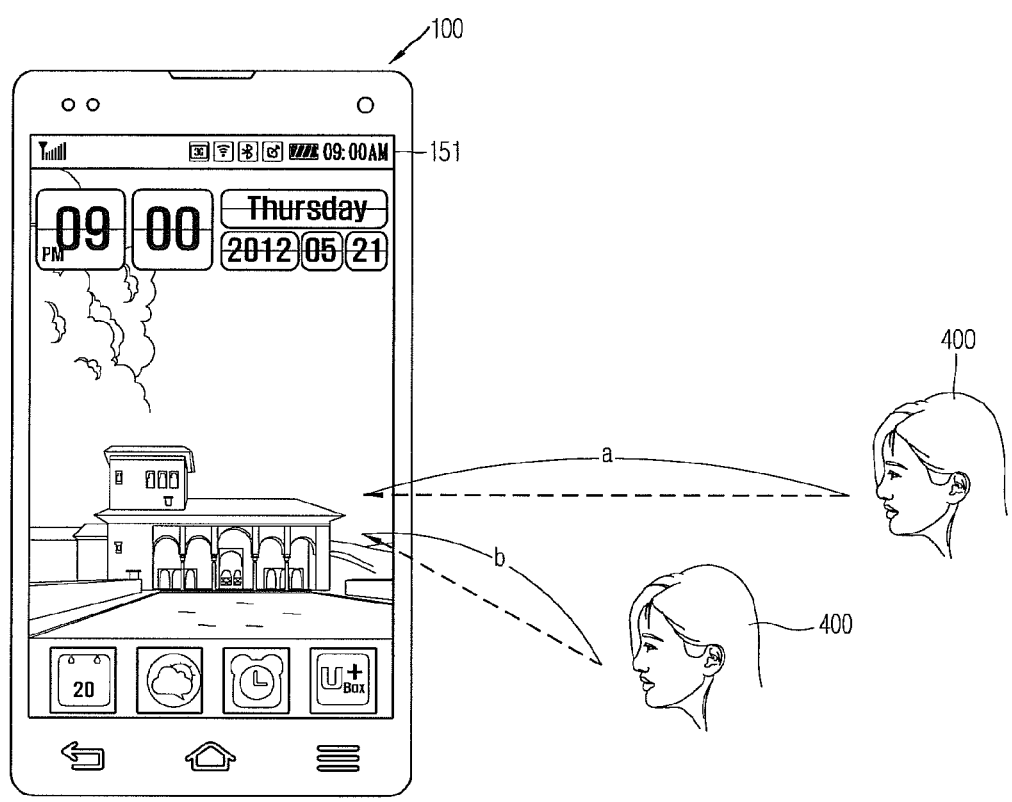
FIG. 13A is a diagram for describing an operating method that is used to control the screen information, output to the mobile terminal, depending on a distance between the mobile terminal according to the embodiment of the present invention and a user location.
Figure 13B:
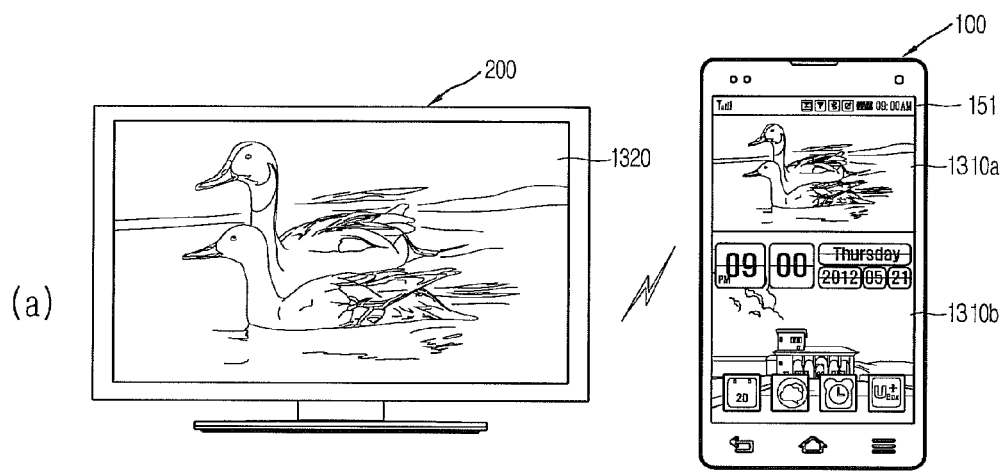
FIG. 13B is a diagram for describing an operating method in which an output state of the external electronic apparatus connected to the mobile terminal according to the embodiment of the present invention is switched to a saving mode, based on a user's stare.
Figure 13B:
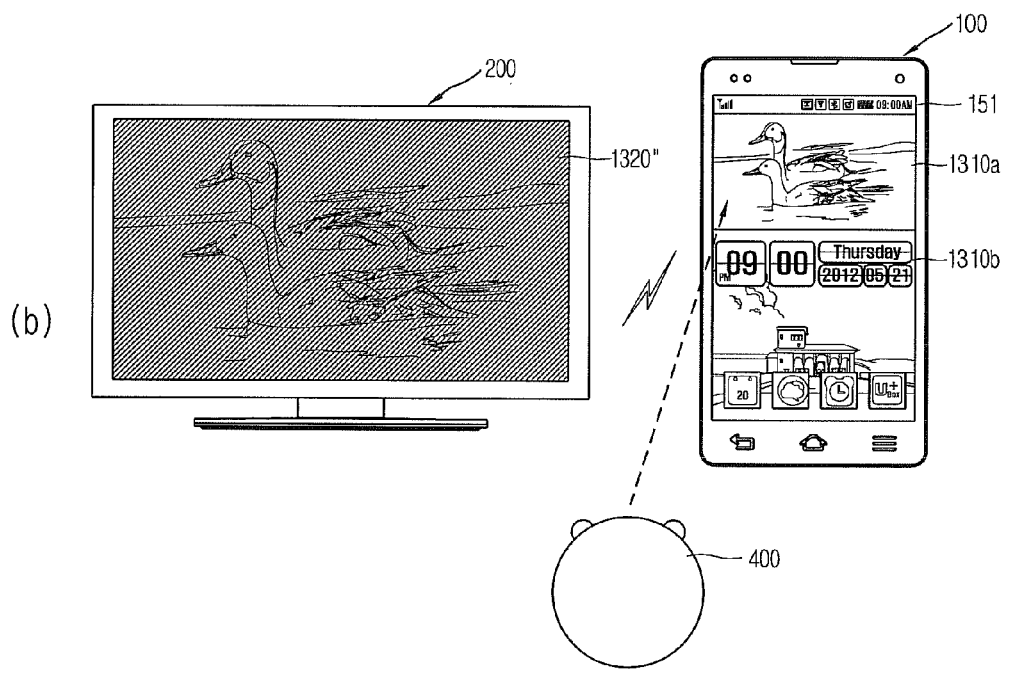

Referring to FIG. 2 and FIGS. 13A and 13B, an operating method is described below that is used to automatically control the first screen information and/or the second screen information that are output to the display unit 151 according to the user location, or to automatically a screen state of the external electronic apparatus 200.

FIG. 13A is a diagram for describing the operating method that is used to control the screen information, output to the mobile terminal, depending on a distance between the mobile terminal according to the embodiment of the present invention and the user location.

The mobile terminal 100 outputs the first screen information to the display unit 151.

The mobile terminal 100 is connected to at least one external electronic apparatus 200, by using the wireless connection standards, such as digital living network alliance (DLNA) guidelines, Wi-Fi standards, Wi-Fi Direct standards and Bluetooth standards. When the mobile terminal 100 and the external electronic apparatus 200 are connected to each other in this manner, the user tracking unit 120 of the mobile terminal 100 detects that the user's stare with respect to the external electronic apparatus 200 is moved to within the predetermined range with the display unit 151 serving as the reference. The controller 180 receives the second screen information that is output to the connected external electronic apparatus 200, based on the user's stare detected by the user tracking unit 120, and displays the received second screen information on the display unit 151, along with the first screen information.

In a state where the first screen information and the second screen information are displayed on the display unit 151 at the same time in this manner, the mobile terminal 100 detects the user location within a predetermined range with the display unit 151 serving as the reference.

To do this, the mobile terminal 100 may further include a user detection unit that is configured to detect the user location from the image captured by the camera 121. In addition, the mobile terminal 100 calculates a distance between the user location and the display unit 151 by causing the infrared light sensor 123 to emit infrared light and detecting the infrared light reflecting back from the user.

Based on the distance between the detected user location and the display unit 151, the controller 180 controls at least one of an output state of the first screen information and/or the second screen information that are displayed on the display unit 151 and a volume of sound that is output to the audio output module 152 to correspond to the output state.

For example, referring to FIG. 13A, the controller performs the control in such a manner that the farther the detected location (a) of the user 400 is away from the display unit 151, the darker the light and shade of the first screen information and/or the second screen information is and the smaller the volume of sound corresponding to the screen is.

On the other hand, the controller performs the control in such a manner that the closer the detection location (b) of the user 400 is to the display unit 151, the lighter the light and shade of the first screen information and/or the second screen information is and the greater the volume of sound corresponding to the screen is. At this time, minimum values and maximum values of the brightness of the screen and the volume of sound, which are automatically controlled according to the distance between the detected location of the user 400 and the display unit 151, are set by applying the user input.

On the other hand, when the control command associated with the brightness of the screen and the volume of sound are input while automatically controlling the brightness of the screen and the volume of sound, the controller 180 adjusts the brightness of the screen and the volume of sound according to the control command that is input. In addition, in a state where the first screen information and the second screen information are displayed on the display unit 151 at the same time in this manner, the mobile terminal 100 detects the user's stare within a predetermined range with the display unit 151 serving as the reference, with the user tracking unit 120.

In this context, FIG. 13B is a diagram for describing an operating method in which the output state of the external electronic apparatus 200 connected to the mobile terminal 100 according to the embodiment of the present invention is switched to a saving mode, based on the user's stare.

If in a state where the first second screen information and the second screen information are displayed on the display unit 151 of the mobile terminal 100 at the same time, the user's stare stays only on the display unit for a predetermined time, the controller 180 recognizes this as a gesture acknowledging that the user no longer uses the external electronic apparatus 200.

That is, when a predetermined time is exceeded after it is detected that the user's stare with respect to the connected external electronic apparatus 200 is moved to within the predetermined range with the display unit 151 serving as the reference, the controller 180 may transmit a wireless signal for converting at least one of the screen and the volume of the sound of the connected external electronic apparatus 200 into a deactivated state, to the connected external electronic apparatus. The external electronic apparatus 200 deactivates at least one of the screen and the sound state according to the received wireless signal. On the other hand, the state of the screen, which is output to the display unit 151 of the mobile terminal 100, and the state of the sound, which is output to the audio output module 152, remain without any changes.

For example, referring to FIG. 13B, when it is detected that the stare of the user 400 is moved, for example, from the graphic display apparatus 200 to the mobile terminal 100, a first screen information 1030b and a second screen information 1030a that is output to the external electronic apparatus 200 are displayed on the display unit 151 of the mobile terminal 100 at the same time. When in a state where the first screen information 1310b and the second screen information 1030a are displayed at the same time in this manner, the predetermined time (for example, five seconds) is exceeded, that is, when the stare of the user 400 stays on the display unit 151 for five seconds or more, the controller 180 darkens the brightness of the screen 1320" of the graphic display apparatus 200. This saves electric power.

In addition, the controller 180 may transmit a wireless signal for gradually adjusting at least one of the brightness of the screen and the volume of the sound of the connected external electronic apparatus 200 according to the extent to which the predetermined time is exceeded, to the connected external electronic apparatus.

For example, when ten minutes elapses after the user's stare stays only on the display unit 151, a first signal for adjusting the brightness of the screen displayed on the external electronic apparatus 200 to a somewhat dark level is transmitted, and when additional ten minutes elapses, a second signal for adjusting the brightness of the screen displayed on the external electronic apparatus 200 to a very dark level is transmitted. At this time, a level of the brightness of the screen is set by applying the user input.

On the other hand, when it is detected that the user's stare within the predetermined range with the display unit 151 serving as the reference is moved back to the connected external electronic apparatus 200, the controller 180 may transmit a wireless signal for converting at least one of the screen and the sound of the connected external electronic apparatus 200 into an activated state to the connected external electronic apparatus 200.

On the other hand, also if in a state where the stare of the user of the mobile terminal 100 stay on the display unit 151, a third party's stare is detected on the external electronic apparatus 200, the controller 180 transmits a wireless signal for converting at least one of the screen and the sound of the connected external electronic apparatus 200 into the activated state to the connected external electronic apparatus 200.

In addition, although not illustrated, when in a state where the first screen information and the second screen information are displayed on the display unit 151 of the mobile terminal 100 at the same time, the distance between the mobile terminal 100 and the external electronic apparatus 200 is out of the predetermined range, the controller 180 causes at least one of the screen and the sound of the external electronic apparatus 200 to be converted into the deactivated state. At this time, it is determined whether or not the distance between the mobile terminal 100 and the external electronic apparatus 200 is out of the predetermined range, by exchanging a predetermined signal through the use of the wireless communication unit 110.

According to the embodiments described above, when the viewing by the user of any one of the mobile terminal and the external electronic apparatus connected to the mobile terminal is not detected for a predetermined time, the screen of the corresponding apparatus and the function associated with the function are realized as being deactivated. This leads to an effect of saving electric power.

As described above, in the mobile terminal according to the embodiment of the present invention and the method of controlling the mobile terminal, the content screen displayed on the external electronic apparatus connected to the mobile terminal is realized as being output along with the screen displayed on the mobile terminal, based on the user's stare. This provides the user with the convenience of viewing or using the screens displayed on the multiple apparatus in the one apparatus at the same time.

In addition, the control and the remote control associated with each screen displayed on one apparatus are realized as being executed in one apparatus. This leads to the practical convenience in controlling the multiple apparatuses. Furthermore, when the viewing by the user is not detected for a predetermined time, the screen of the corresponding apparatus and the function associated with the screen are realized as being deactivated. This leads to the effect of saving electric power.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, and all of, or some of the embodiments may be selectively combined with each other in a manner that creates various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
 a display to display a first screen information;
 a user tracking device to detect that a user's stare with respect to a connected external electronic apparatus is within a predetermined range with the display serving as a reference; and
 a controller to receive a second screen information from the connected external electronic apparatus based on the detected user's stare, and the controller to control the display to simultaneously display the received second screen information and the first screen information.

2. The mobile terminal of claim 1, wherein the user tracking device to detect a movement of the user's stare by using a first signal and a second signal,
 the first signal corresponding to whether or not to detect a user's eye received from the connected external electronic apparatus, and the second signal corresponding to whether or not to detect the user's eye based on at least one sensor at the mobile terminal.

3. The mobile terminal of claim 1, wherein the display includes a first region and a second region distinguishable from the first region, and
wherein when the detected user's stare is moved to within the predetermined range with the display, the controller to control the display such that the first screen information is displayed on the first region of the display and the second screen information is displayed on the second region of the display.

4. The mobile terminal of claim 3, wherein the controller to designate the second region of the display, based on a touch input, and the controller to control the display such that the second screen information is displayed at the designated second region.

5. The mobile terminal of claim 3, further comprising:
an inclination detection device to detect an inclination of the mobile terminal, and wherein the controller to determine the second region of the display based on the detected user's stare and the detected inclination of the mobile terminal.

6. The mobile terminal of claim 1, wherein when the second screen information is displayed on the display and the detected user's stare remains, for a prescribed time, on a region that displays the first screen information, the controller to control the display to remove the second screen information.

7. The mobile terminal of claim 1, wherein when the second screen information is displayed on the display and the detected user's stare remains on a region that displays the second screen information, the controller to control the display to display the second screen information on substantially all screen regions of the display.

8. The mobile terminal of claim 1, wherein in response at a first touch at a region that displays the second screen information, the controller to reduce the second screen information and display the reduced second screen information, and
in response to a second touch to the second screen information, the controller to control the display such that the second screen information is displayed on substantially all screen regions of the display.

9. The mobile terminal of claim 1, wherein in response to an event that occurs while the second screen information is displayed, the controller to switch the first screen information and the second screen information to a screen information relating to the event, or to display an icon for switching to the screen information.

10. The mobile terminal of claim 1, wherein when the detected user's stare within the predetermined range with the display is moved to a screen of the connected external electronic apparatus, the controller to transmit the first information to the connected external electronic apparatus.

11. The mobile terminal of claim 10, wherein when the first screen information is transmitted to the connected external electronic apparatus and an event occurs at the mobile terminal, the controller to transmit event data corresponding to the event to the connected external electronic apparatus when the mobile terminal is in a normal mode, and the controller to transmit only a notification message relating to an occurrence of the event to the connected external electronic apparatus when the mobile terminal is in a user protection mode.

12. The mobile terminal of claim 1, wherein when the second screen information is displayed on the display, an input mode of the mobile terminal is entered, and the controller to control the display such that at least one part of a region on which the second screen information is displayed is switched to a region into which information is input, and the information input to the region is displayed on the second screen information such that the region to input information overlaps the second screen information.

13. The mobile terminal of claim 1, wherein when a predetermined time is exceeded after the user's stare is detected with respect to the connected external electronic apparatus to be within the predetermined range with the display, the controller to provide a first wireless signal to the connected external electronic apparatus, the first wireless signal to convert at least one of a screen and a sound of the connected external electronic apparatus into a deactivated state.

14. A method of controlling a mobile terminal, the method comprising:
displaying first screen information on a display;
connecting to an external electronic apparatus;
detecting that a user's stare with respect to the connected external electronic apparatus is within a predetermined range with the display;
receiving a second screen information from the connected external electronic apparatus based on the detected user's stare; and
simultaneously displaying the received second screen information and the first screen information.

15. The method of claim 14, further comprising:
displaying the second screen information on substantially all screen regions of the display when the detected user's stare remains on a region that displays the second screen information; and
removing the second screen information from the display when the user's stare remains on a region that displays the first screen information, for a predetermined time, when the second screen information is displayed on the display.

16. The method of claim 14, wherein the first screen information is displayed on a first region of the display and the second screen information is displayed on a second screen region of the display.

17. The method of claim 16, further comprising designating the second region of the display, based on a touch input, and controlling the display such that the second screen information is displayed on the designated second region.

18. The method of claim 16, further comprising:
detecting an inclination of the mobile terminal, and
determining the second region based on the detected user's stare and the detected inclination of the mobile terminal.

19. The method of claim 14, further comprising removing the second screen information when the detected user's stare remains, for a prescribed time, on a region that displays the first screen information.

20. The method of claim 14, further comprising displaying the second screen information on substantially all screen regions of the display when the detected user's stare remains on a region that displays the second screen information.

21. The method of claim 14, further comprising:
reducing the second screen information in response to a first touch to a region that displays the second screen information, and
displaying the second screen information on substantially all screen regions of the display in response to a second touch to the second screen information.

22. The method of claim 14, further comprising switching the first screen information and the second screen information to a screen information relating to the event in response to an event occurring in a state in which the second screen information is displayed on the display.

23. The method of claim 14, further comprising transmitting the first screen information to the connected external electronic apparatus when the detected user's stare is moved to a screen of the connected external electronic apparatus.

24. The method of claim 23, further comprising transmitting event data corresponding to an event to the connected external electronic apparatus when in a normal mode, and transmitting only a notification message relating to an occurrence of the event to the connected external electronic apparatus when in a user protection mode.

25. The method of claim 14, wherein when a predetermined time is exceeded after it is detected that the user's stare with respect to the connected external electronic apparatus is within the predetermined range with the display, transmitting a first wireless signal to the connected external electronic apparatus, the first wireless signal to convert at least one of a screen and a sound of the connected external electronic apparatus into a deactivated state.

26. A mobile terminal comprising:
a display to display a first screen information; and
a controller to detect that a user's eye viewing with respect to a connected external electronic device is within a predetermined range with the display serving as a reference, and in response to the detected user's eye viewing, the controller to control the display to simultaneously display the second screen information received from the connected external electronic device and the first screen information.

27. The mobile terminal of claim 26, wherein the controller to detect a movement of the user's eye viewing by using a first signal and a second signal,
the first signal corresponding to whether or not to detect a user's eye received from the connected external electronic device, and
the second signal corresponding to whether or not to detect the user's eye based on at least one sensor at the mobile terminal.

28. The mobile terminal of claim 26, wherein the display includes a first region and a second region distinguishable from the first region, and
wherein when the detected user's eye viewing is moved to within the predetermined range with the display, the controller to control the display such that the first screen information is displayed on the first region of the display and the second screen information is displayed on the second region of the display.

29. The mobile terminal of claim 28, wherein the controller to designate the second region of the display, based on a touch input, and the controller to control the display such that the second screen information is displayed on the designated second region.

30. The mobile terminal of claim 28, further comprising:
an inclination detection device to detect an inclination of the mobile terminal, and wherein the controller to determine the second region of the display based on the detected user's eye viewing and the detected inclination of the mobile terminal.

31. The mobile terminal of claim 26, wherein when the second screen information is displayed on the display and the detected user's eye viewing remains, for a prescribed time, on a region that displays the first screen information, the controller to control the display to remove the second screen information.

32. The mobile terminal of claim 26, wherein when the second screen information is displayed on the display and the detected user's eye viewing remains on a region that displays the second screen information, the controller to control the display to display the second screen information on substantially all screen regions of the display.

* * * * *